(12) United States Patent
Hongo et al.

(10) Patent No.: US 8,679,336 B2
(45) Date of Patent: Mar. 25, 2014

(54) MICROCHANNEL DEVICE, SEPARATION APPARATUS, AND SEPARATION METHOD

(75) Inventors: Kazuya Hongo, Kanagawa (JP); Takayuki Yamada, Kanagawa (JP); Seiichi Takagi, Kanagawa (JP); Hiroshi Kojima, Kanagawa (JP); Masaki Hirota, Kanagawa (JP); Kazuaki Tabata, Kanagawa (JP); Tetsuo Ohta, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 912 days.

(21) Appl. No.: 12/422,528

(22) Filed: Apr. 13, 2009

(65) Prior Publication Data

US 2010/0122957 A1   May 20, 2010

(30) Foreign Application Priority Data

Nov. 14, 2008   (JP) .................. 2008-292428

(51) Int. Cl.
*B01D 63/08* (2006.01)
*B01D 61/18* (2006.01)
*G05B 7/04* (2006.01)

(52) U.S. Cl.
USPC ............ 210/321.64; 210/321.84; 210/321.75; 210/321.72; 210/490; 137/833

(58) Field of Classification Search
USPC .................................. 210/321.64
See application file for complete search history.

(56) References Cited

U.S. PATENT DOCUMENTS

| | | | |
|---|---|---|---|
| 3,424,437 A | 1/1969 | Shearer | |
| 3,860,217 A | 1/1975 | Grout | |
| 4,050,676 A | 9/1977 | Morishima et al. | |
| 5,061,544 A | 10/1991 | Wada et al. | |
| 5,087,330 A | 2/1992 | Wada et al. | |
| 5,783,129 A | 7/1998 | Shirai et al. | |
| 5,938,333 A | 8/1999 | Kearney | |
| 6,082,891 A | 7/2000 | Schubert et al. | |
| 6,186,660 B1 | 2/2001 | Kopf-Sill et al. | |
| 6,245,249 B1 | 6/2001 | Yamada et al. | |

(Continued)

FOREIGN PATENT DOCUMENTS

| | | |
|---|---|---|
| EP | 1 481 724 A1 | 12/2004 |
| EP | 1 577 000 A2 | 9/2005 |

(Continued)

OTHER PUBLICATIONS

Xu Ji et al., "A Centrifugation-Enhanced High-Efficiency Micro-Filter with Spiral Channel", Transducers & Eurosensors '07, The 14th International Conference on Solid-State Sensors, Actuators and Microsystems, Lyon, France, Jun. 10-14, 2007, pp. 1865-1868.
Notification of Reasons for Refusal dated Oct. 5, 2010 in corresponding Japanese Patent Application No. 2008-292428 (with translation).
Apr. 9, 2012 Office Action issued in U.S. Appl. No. 12/185,464.

(Continued)

*Primary Examiner* — Krishnan S Menon
(74) *Attorney, Agent, or Firm* — Oliff PLC

(57) ABSTRACT

A microchannel device is provided, the microchannel device containing a microfluidic channel including a sub fluidic channel in which at least one filtration diaphragm is provided, wherein the microfluidic channel has at least a supply port, a first discharge port and a second discharge port, the supply port and the first discharge port are connected through the filtration diaphragm, the supply port and the second discharge port are connected without the filtration diaphragm, and the filtration diaphragm is provided parallel to a fluidic channel direction of the microfluidic channel.

13 Claims, 14 Drawing Sheets

(56) References Cited

U.S. PATENT DOCUMENTS

| | | | |
|---|---|---|---|
| 6,355,173 B1* | 3/2002 | den Bieman et al. | 210/636 |
| 6,361,824 B1 | 3/2002 | Yekimov et al. | |
| 6,368,871 B1 | 4/2002 | Christel et al. | |
| 6,616,327 B1 | 9/2003 | Kearney et al. | |
| 6,818,394 B1 | 11/2004 | O'Donnell-Maloney et al. | |
| 7,449,159 B2 | 11/2008 | Nomura et al. | |
| 8,147,121 B2 | 4/2012 | Lacy et al. | |
| 2002/0058332 A1 | 5/2002 | Quake et al. | |
| 2003/0008308 A1 | 1/2003 | Enzelberger et al. | |
| 2004/0213083 A1 | 10/2004 | Fujiwara et al. | |
| 2005/0163701 A1 | 7/2005 | Tonkovich et al. | |
| 2005/0167354 A1* | 8/2005 | Caze et al. | 210/321.84 |
| 2005/0207952 A1 | 9/2005 | Mae | |
| 2005/0207953 A1 | 9/2005 | Upadhye et al. | |
| 2006/0073080 A1 | 4/2006 | Tonkovich et al. | |
| 2006/0140829 A1 | 6/2006 | Tabata et al. | |
| 2006/0159601 A1 | 7/2006 | Yamada et al. | |
| 2006/0272722 A1 | 12/2006 | Yamada et al. | |
| 2007/0062856 A1* | 3/2007 | Pahl et al. | 210/321.75 |
| 2007/0139451 A1 | 6/2007 | Somasiri et al. | |
| 2007/0183933 A1 | 8/2007 | Kawazoe et al. | |
| 2007/0256736 A1 | 11/2007 | Tonkovich et al. | |
| 2007/0286795 A1 | 12/2007 | Chiba et al. | |
| 2008/0226517 A1 | 9/2008 | Vitucci et al. | |
| 2008/0245745 A1 | 10/2008 | Ward et al. | |
| 2009/0130025 A1 | 5/2009 | Bohmer et al. | |
| 2010/0008179 A1 | 1/2010 | Lacy et al. | |
| 2010/0068366 A1 | 3/2010 | Tonkovich et al. | |

FOREIGN PATENT DOCUMENTS

| | | |
|---|---|---|
| EP | 1 767 268 A1 | 3/2007 |
| JP | A-50-002256 | 1/1975 |
| JP | B-H06-37291 | 5/1994 |
| JP | A-09-512742 | 12/1997 |
| JP | A-10-305488 | 11/1998 |
| JP | A-10-512197 | 11/1998 |
| JP | A-2000-506432 | 5/2000 |
| JP | A-2000-238000 | 9/2000 |
| JP | A-2001-509728 | 7/2001 |
| JP | A-2002-527250 | 8/2002 |
| JP | A-2002-292274 | 10/2002 |
| JP | A-2003-194806 | 7/2003 |
| JP | A-2004-154648 | 6/2004 |
| JP | A-2004-223637 | 8/2004 |
| JP | A-2004-330008 | 11/2004 |
| JP | A-2004-344877 | 12/2004 |
| JP | A-2004-354180 | 12/2004 |
| JP | A-2004-358602 | 12/2004 |
| JP | A-2005-28267 | 2/2005 |
| JP | A-2005-072652 | 3/2005 |
| JP | A-2005-144634 | 6/2005 |
| JP | A-2005-152763 | 6/2005 |
| JP | A-2005-246294 | 9/2005 |
| JP | A-2005-262053 | 9/2005 |
| JP | A-2006-015254 | 1/2006 |
| JP | A-2006-61870 | 3/2006 |
| JP | A-2006-088077 | 4/2006 |
| JP | A-2006-95515 | 4/2006 |
| JP | A-2006-150347 | 6/2006 |
| JP | A-2006-161717 | 6/2006 |
| JP | A-2006-167612 | 6/2006 |
| JP | A-2006-187684 | 7/2006 |
| JP | A-2006-187685 | 7/2006 |
| JP | A-2006-272231 | 10/2006 |
| JP | A-2006-272232 | 10/2006 |
| JP | A-2006-305505 | 11/2006 |
| JP | A-2006-341140 | 12/2006 |
| JP | A-2007-100072 | 4/2007 |
| JP | A-2007-105667 | 4/2007 |
| JP | A-2007-519510 | 7/2007 |
| JP | A-2007-252979 | 10/2007 |
| JP | A-2007-260678 | 10/2007 |
| JP | T-2008-514428 | 5/2008 |
| JP | A-2008-168173 | 7/2008 |
| WO | WO 95/30476 | 11/1995 |
| WO | WO 97/14497 A1 | 4/1997 |
| WO | WO 00/22436 | 4/2000 |
| WO | WO 2006/039568 A1 | 4/2006 |
| WO | WO 2006/046202 A1 | 5/2006 |
| WO | WO 2006/087655 A1 | 8/2006 |

OTHER PUBLICATIONS

Jun. 4, 2012 Office Action issued in U.S. Appl. No. 11/905,931.
Jul. 25, 2012 Office Action in U.S. Appl. No. 11/783,394, filed Apr. 9, 2007.
Sep. 26, 2011 Office Action issued in Japanese Application No. 2007-275991 (with translation).
May 24, 2011 Office Action issued in Japanese Patent Application No. 2009-063109 (with translation).
Feb. 24, 2011 Office Action issued in Japanese Patent Application No. 2009-063109 (with translation).
Takei et al. "Sub-Nano Litter Micro Batch Operation Systems With Multi-Step Laplace Pressure Valves Prepared by Photocatalytic Analog Lithography", The 10th International Conference on Miniaturized Systems for Chemistry and Life Science, Nov. 5-9, 2006, pp. 245-247, Tokyo, Japan.
Hideo Yoshida; "Surface Tension", Proceedings of the TED-COF. '01, Japan Society of Mechanical Engineers, 2001, pp. 1-5.
Oct. 17, 2011 Office Action issued in U.S. Appl. No. 12/196,783.
Oct. 27, 2009 Office Action issued in U.S. Appl. No. 11/905,931.
Mar. 22, 2010 Office Action issued in U.S. Appl. No. 11/905,931.
May 11, 2011 Office Action issued in U.S. Appl. No. 11/905,931.
Sep. 16, 2011 Office Action issued in U.S. Appl. No. 11/905,931.
Miyashita et al. "Sonic Crystal Waveguide—Numerical Simulations and Experiments", Technical Report of The Institute of Electronics, Information and Communication Engineers, Jun. 2001, pp. 33-39 (with abstract).
Mizukoshi et al. "25th Lecture Summary of Surface Science Lecture Convention", The Surface Science Society Japan, Nov. 14, 2005 (with translation).
Jan. 21, 2011 Office Action issued in U.S. Appl. No. 12/185,464.
Jul. 18, 2011 Office Action issued in U.S. Appl. No. 12/185,464.
Nov. 30, 2010 Office Action issued in Japanese Patent Application No. 2006-195904 (with translation).
Aug. 20, 2009 Office Action issued in U.S. Appl. No. 11/783,394.
Jun. 8, 2010 Office Action issued in U.S. Appl. No. 11/783,394.
Mar. 25, 2011 Office Action issued in U.S. Appl. No. 11/783,394.
Oct. 13, 2011 Office Action issued in U.S. Appl. No. 11/783,394.
U.S. Appl. No. 12/196,783 in the name of Tabata et al., filed Aug. 22, 2008.
U.S. Appl. No. 12/575,136 in the name of Takahashi et al., filed Oct. 7, 2009.
U.S. Appl. No. 12/185,464 in the name of Tabata et al., filed Aug. 4, 2008.
U.S. Appl. No. 11/905,931 in the name of Yamada et al., filed Oct. 5, 2007.
U.S. Appl. No. 11/783,394 in the name of Tabata et al., filed Apr. 9, 2007.
Oct. 18, 2011 Office Action issued in Japanese Patent Application No. 2007-266414 (with translation).
May 10, 2013 Office Action issued in U.S. Appl. No. 12/575,136.
May 22, 2012 Office Action issued in Japanese patent application 2007-080768 (with translation).
Jan. 23, 2013 Office Action issued in U.S. Appl. No. 12/575,136.
Nov. 14, 2012 Notice of Allowance issued in U.S. Appl. No. 11/783,394.
Feb. 16, 2012 Final Office Action issued in U.S. Appl. No. 12/196,783.
Feb. 6, 2012 Office Action issued in U.S. Appl. No. 11/783,394.
Sep. 20, 2012 Office Action issued in U.S. Appl. No. 12/575,136, filed Oct. 7, 2009.
Sep. 12, 2013 Office Action issued in U.S. Appl. No. 12/196,783.

* cited by examiner

MICROCHANNEL DEVICE, SEPARATION APPARATUS, AND SEPARATION METHOD

CROSS-REFERENCE TO RELATED APPLICATIONS

This application is based on and claims priority under 35 U.S.C. 119 from Japanese Patent Application No. 2008-292428 filed Nov. 14, 2008.

BACKGROUND

1. Technical Field

The present invention relates to a microchannel device, a separation apparatus, and a separation method.

2. Related Art

As methods for separating or concentrating particles from dispersion particle liquids, there have been provided methods using sieves, separation membranes, filters, etc., and methods of classification based on the balance between centrifugal force and inertial force by a rotor and a stator or the like.

Also, in recent years, separating and concentrating devices using the micro-devices have also been proposed.

SUMMARY

According to an aspect of the present invention, there is provided a microchannel device containing: a microfluidic channel including a sub fluidic channel in which at least one filtration diaphragm is provided, wherein the microfluidic channel has at least a supply port, a first discharge port and a second discharge port, the supply port and the first discharge port are connected through the filtration diaphragm, the supply port and the second discharge port are connected without the filtration diaphragm, and the filtration diaphragm is provided parallel to a fluidic channel direction of the microfluidic channel.

BRIEF DESCRIPTION OF THE DRAWINGS

Exemplary embodiment of the present invention will be described in detail based on the following figures, wherein:

FIG. 18A is a top schematic view showing a part of the porous film 500, FIG. 18B is a b-b section schematic view of FIG. 18A and FIG. 18C is a c-c section schematic view of FIG. 18A.

DETAILED DESCRIPTION

Figure 1:
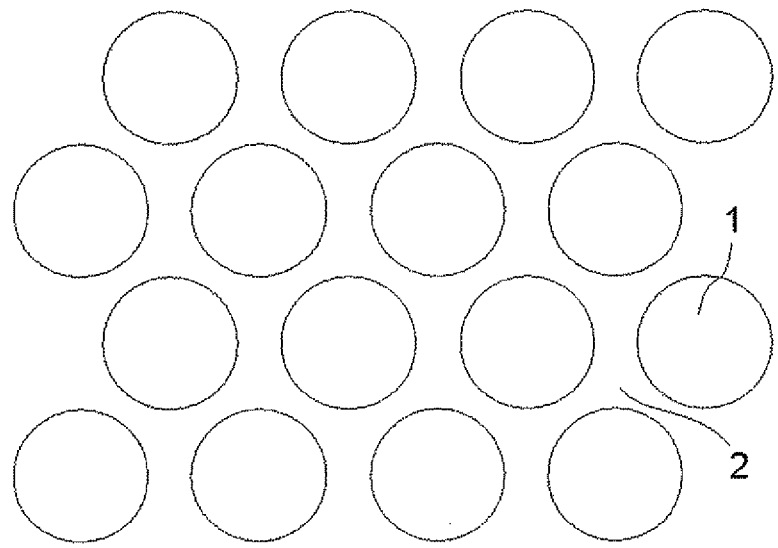
FIG. 1 is a schematic view showing an example of a filter pore shape pattern of a filtration diaphragm in the microchannel device of the exemplary embodiment of the present invention.

The microchannel device of the present embodiment can be favorably used as separating ways in a separation apparatus or a separation method.

It is assumed for the microchannel device of the exemplary embodiment of the present invention that, as a result of the filtration diaphragm being provided parallel to a fluidic channel direction of the microfluidic channel (i.e. a lengthwise direction of the microfluidic channel), the filter is hardly clogged with particles contained in a fluid, and thus continuous long-time use is possible, and moreover, particles after passing through the filter rarely return to the side of large particles before passing through the filter, and thus separation accuracy is improved. Even if clogging occurs, the particles with which the filter has been clogged are removed by supplying a dispersion medium or a gas from one of the discharge ports connected though the filtration diaphragm and discharging the dispersion medium or gas from the supply port while blocking the other discharge port to wash the interior of the fluidic channel, so-called backwashing.

Moreover, it is assumed for the microchannel device of the exemplary embodiment of the present invention that, because of use of a micro-field, the filter has a large specific surface area effect, and separation efficiency is high, and further, because the area of the filtration diaphragm used as a filter is small, this is hardly damaged, and it is assumed that pressure loss is reduced because the opening ratio may be increased to the maximum, so that throughput may be increased.

The microchannel device of the exemplary embodiment of the present invention has a microfluidic channel in which at least one filtration diaphragm is provided.

The microfluidic channel has at least one supply port and two discharge ports. The microfluidic channel may have two or more supply ports, and may have three or more discharge ports, according to necessity.

Moreover, in the microfluidic channel, the supply port and one of the discharge ports are connected through the filtration diaphragm, the supply port and the other discharge port are connected without passing through the filtration diaphragm. More specifically, there provided at, at least, a part of the microfluidic channel partitioned by the filtration diaphragm is one or more supply ports and one or more discharge ports, and there provided at, at least, another part of the microfluidic channel partitioned by the filtration diaphragm different from the above-mentioned part is one or more discharge ports, or one or more discharge ports and one or more supply ports different from the above-mentioned supply port(s).

When the microchannel device of the exemplary embodiment of the present invention has two or more filtration diaphragms in the microfluidic channel, the supply port and one of the discharge ports are connected through at least one of the filtration diaphragms, and the supply port and the other discharge port are connected without the filtration diaphragm.

The supply port and the discharge ports are not particularly limited in shape, and it suffices to provide these as aperture of shapes according to necessity, such as circular holes, elliptical holes, square holes, slots, cross-shaped holes.

Moreover, for the supply port and the discharge port, a difference in shape is not particularly necessary therebetween in the microchannel device of the exemplary embodiment of the present invention, and these may be either opening portions having identical shapes or opening portions having different shapes.

Moreover, for the microchannel device of the exemplary embodiment of the present invention, for example, an operation of pouring a fluid from the discharge port and discharging the fluid from the supply port may be performed for the purpose of performing so-called backwashing or the like.

As the filtration diaphragm, various filters, such as a mesh-like filter woven from pulp fibers, plastic fibers, or metallic fibers, a metallic filter made in a filter form through precision processing by etching or electroforming, a honeycomb filter made of plastic due to self-assembly, a ceramic filter, can be favorably used. In particular, for processing with efficiency, it is preferable to use a filter with a high opening ratio.

As the honeycomb filter, a publicly-known one can be used, and examples thereof include resin films made of self-assembled films with high opening ratios described in Japanese Published Unexamined Patent Application No. 2001-157574, Japanese Published Unexamined Patent Application No. 2005-262777, Japanese Published Unexamined Patent Application No. 2007-291367, etc.

In terms of ease in manufacturing, the pore diameter of the honeycomb filter is preferably 0.1 µm to 50 µm, and the thickness is preferably 20 µm or less.

As the material of the honeycomb filter, various types of plastic may be used, and in terms of strength, polycarbonates, polyamides, polysulfones, polystyrenes, polymethyl methacrylates, ultraviolet curing resins, polydimethylsiloxanes, polyphenylmethylsiloxanes, epoxys, Teflon (registered trademark), polyimides, etc., are preferable.

As the metallic filter, a publicly-known one can be used.

A production method for the metallic filter is not particularly limited, and by, for example, producing this as a thin-film pattern precisely processed by an etching process or an electroforming process and laminating the thin-film pattern along with other thin-film patterns, even a microchannel device of a complicated shape can be easily manufactured. Producing a metallic filter by electroforming is preferable because this allows reducing the film thickness, the pore diameter accuracy is high, and overall uniformity is also excellent, so that highly accurate separation becomes possible.

As the material of the metallic filter, various types of metal may be used, and it may be an alloy, a lamination of a plurality of types of metallic layers, and one applied with a surface treatment. Among these, it is preferable that the material is nickel (Ni), aluminum (Al), iron (Fe), gold (Au), silver (Ag), platinum (Pt), palladium (Pd), or copper (Cu).

When the metallic filter is produced by the electroforming, the film thickness of the metallic filter is preferably 0.1 µm to 500 µm, and the pore diameter is preferably 0.5 µm to 100 µm, and more preferably, 1 µm to 50 µm.

The filtration diaphragm is not particularly limited in the shape of filter pores, and a circular shape, an elliptical shape, a polygonal shape, etc., can be mentioned, and among these it is preferable that the shape is a circle, a quadrangle, a triangle, and/or a hexagon.

Figure 2:
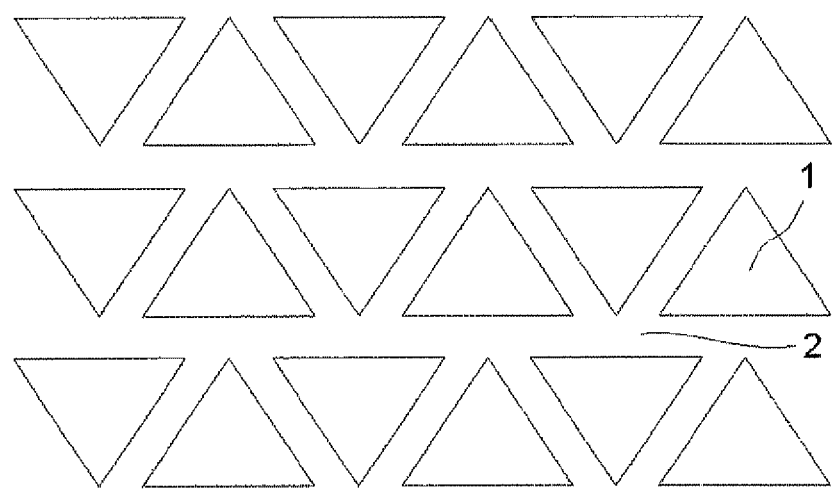
FIG. 2 is a schematic view showing another example of a filter pore shape pattern of a filtration diaphragm in the microchannel device of the exemplary embodiment of the present invention.
Figure 3:
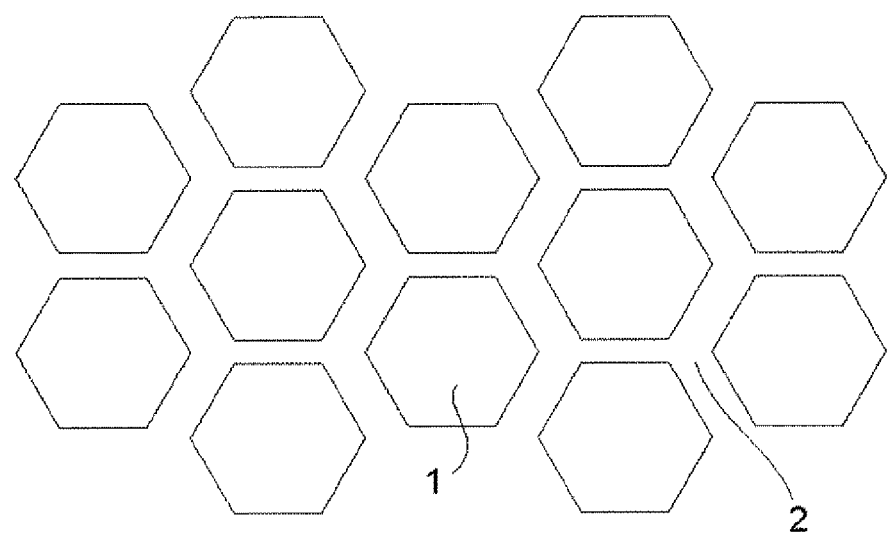
FIG. 3 is a schematic view showing another example of a filter pore shape pattern of a filtration diaphragm in the microchannel device of the exemplary embodiment of the present invention.

The filtration diaphragm is not particularly limited in the shape pattern of filter pores, and patterns arranged with circles, ellipses, polygons, etc., can be mentioned, and examples thereof favorably include a shape of circular fitter pores as shown in FIG. 1, a shape of triangular filter pores as shown in FIG. 2, and a shape of hexagonal filter pores as shown in FIG. 3.

Moreover, when almost spherical particles are to be classified, pores having shapes other than a circular shape are preferable because gaps are produced even when the filter pores are blocked with the particles and the fluid is not completely inhibited from flowing.

Figure 4:
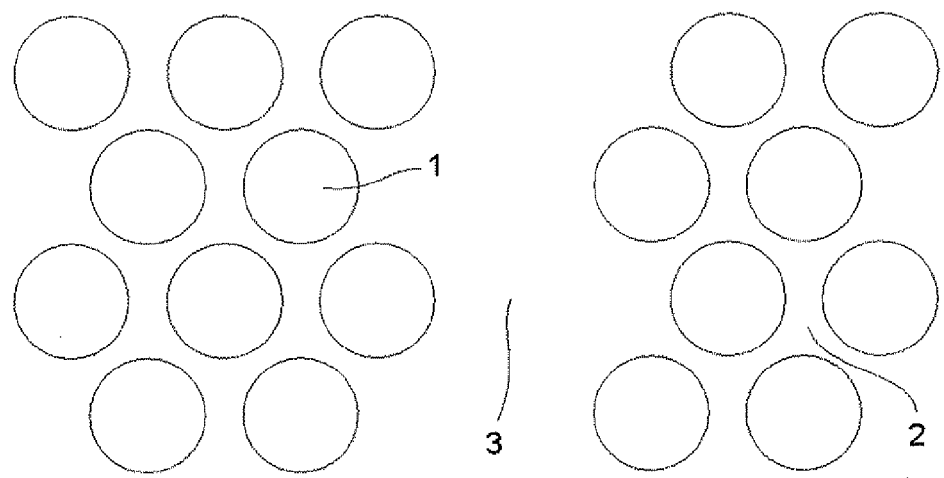
FIG. 4 is a schematic view showing another example of a filter pore shape pattern of a filtration diaphragm in the microchannel device of the exemplary embodiment of the present invention.
Figure 5:
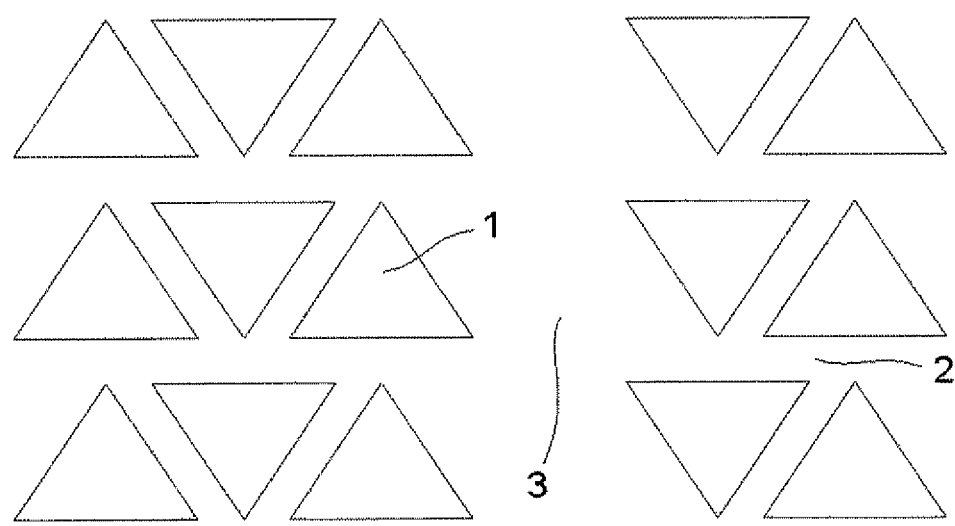
FIG. 5 is a schematic view showing another example of a filter pore shape pattern of a filtration diaphragm in the microchannel device of the exemplary embodiment of the present invention.

Moreover, as the shape pattern of filter pores in the filtration diaphragm, it is preferable, as shown in FIG. 4 and FIG. 5, to provide a part (a reinforcing portion 3) without filter pores 1 in a part of the filtration diaphragm. As a result of providing the reinforcing portion, even a filtration diaphragm having a thin film thickness may obtain sufficient strength. In addition, it is also possible to form a shape pattern of filter pores on only a fluidic channel face and not to manufacture a part where no fluidic channel is formed.

When the microchannel device of the exemplary embodiment of the present invention has two or more filtration diaphragms, it is preferable that the pore diameters of the filtration diaphragms are reduced in order from the supply port to the discharge port. If in the above-mentioned mode, it is possible to classify a particle dispersion liquid containing particles of various particle diameters at one time, and moreover, classification further excellent in accuracy becomes possible.

Moreover, when the microchannel device of the exemplary embodiment of the present invention has n filtration diaphragms, it is preferable to satisfy the following expression:

$$P_0 \geq P_1 \geq P_2 \geq \ldots \geq P_n$$

where $P_n$ represents a pressure after passing through the n filtration diaphragms and n represents an integral number.

In the microchannel device of the exemplary embodiment of the present invention, the microfluidic channel means a fluidic channel having a fluidic channel diameter of 5,000 µm or less. In addition, the fluidic channel diameter is a circle-equivalent diameter determined from a sectional area of the fluidic channel.

As a microfluidic channel, a device having a fluidic channel diameter of a few to a few thousand micrometers is preferably used. The fluidic channel diameter of the microfluidic channel of the device is preferably from 10 μm or about 10 μm to 5,000 μm or about 5,000 μm, and more preferably, from 20 μm or about 20 μm to 3,000 μm or about 3,000 μm. The microchannel device is a reactor having a plurality of micro-scaled channels. Because of being of micro-scale, the fluidic channels of the device have small dimensions and flow rate, and have a Reynolds number of 2,300 or less. Accordingly, the device having microfluidic channels is a device with laminar flow control not with turbulent flow control as in ordinary devices. It is preferable that the interior of a fluidic channel in the periphery of the filtration diaphragm is also in a laminar flow-controlled condition.

Here, the Reynolds number (Re) is expressed by the following expression, and a laminar flow-controlled condition is brought about at 2,300 or less.

$$Re = uL/v$$

(u: flow rate, L: typical length, v: coefficient of kinematic viscosity)

In the microchannel device of the exemplary embodiment of the present invention, the length of a plurality of fluidic channels having filtration diaphragms provided parallel to the fluidic channel direction is preferably in a range of from 5 mm or about 5 mm to 300 mm or about 300 mm, and more preferably, in a range of from 10 mm or about 10 mm to 200 mm or about 200 mm. In addition, the interval of the plurality of fluidic channels is preferably in a range of 1 μm to 10,000 μm, and more preferably, in a range of 10 μm to 5,000 μm.

Also, the sectional shape of the microfluidic channel is not particularly limited, and can be appropriately selected from a circular shape, an elliptical shape, a polygonal shape, a middle swollen shape, etc., according to the purpose. Among these, the sectional shape of the microfluidic channel is preferably a circle, an ellipse, or a rectangle, and more preferably, a circle or a rectangle.

The microchannel device of the present invention can be favorably used as a microchannel device for separation, and can be more favorably used as a microchannel device for particle separation, and can be further favorably used as a microchannel device for separation of particles having particle diameters of 0.01 μm to 500 μm.

As a matter of course, the "separation" in the exemplary embodiment of the present invention connotes classification and concentration.

The size of the microchannel device can be appropriately set according to the purpose of use, but is preferably in a range of 1 cm² to 500 cm², and more preferably, in a range of 10 cm² to 300 cm². In addition, the thickness of the microchannel device is preferably in a range of 2 mm to 50 mm, and more preferably, in a range of 3 mm to 30 mm.

The microchannel device of the exemplary embodiment of the present invention may, depending on the intended use thereof, have other microfluidic channels, sections having functions of reaction, mixing, purification, analysis, washing, etc., besides the microfluidic channels described above.

The separation apparatus of the exemplary embodiment of the present invention includes the microchannel device of the exemplary embodiment of the present invention.

The separation method of the exemplary embodiment of the present invention includes a step of performing separation using the microchannel device of the exemplary embodiment of the present invention, and preferably includes a step of performing separation of a particle dispersion liquid using the microchannel device of the exemplary embodiment of the present invention.

Moreover, for the separation apparatus and separation method of the exemplary embodiment of the present invention, depending on the intended use thereof, a separation apparatus can be favorably constructed by combining a plurality of the microchannel devices of the exemplary embodiment of the present inventions or combining units having functions of reaction, mixing, purification, analysis, washing, etc., and a liquid feeding unit, a recovery unit, other microchannel devices, etc.

The separation apparatus of the exemplary embodiment of the present invention can be favorably used as a classification apparatus of particles. More specifically, the separation apparatus of the exemplary embodiment of the present invention is favorable as a classification apparatus from a supply port of which a particle dispersion liquid is supplied and from a discharge port of which classified particles are discharged.

The particles to be classified are not particularly limited, and examples thereof include resin particles, inorganic particles, metal particles, pigment particles, and ceramic particles.

The diameter of the particles in the particle dispersion liquid is preferably 0.01 μm or more and 500 μm or less, and more preferably, 0.1 μm or more and 200 μm or less. The particle diameter being within the above-mentioned range is preferable because this allows suppressing clogging of the fluidic channel and obtaining high classifying efficiency, and is preferable because this hardly causes adhesion of the particles to the inner wall of the fluidic channel.

The shape of the particles is not particularly limited, however, the ratio of the long axis length of the particles to the short axis length thereof (long axis length/short axis length) is preferably in a range of 1 to 50, and more preferably, in a range of 1 to 20. Also, it is preferable to appropriately select the flow channel width in accordance with the particle diameter and the particle shape.

The types of the particles that may be used in the separation method of the exemplary embodiment of the present invention include, without limitation thereto, ones enumerated in the following. Examples thereof include polymer particles (resin particles), crystals or aggregates of organic substances such as pigments, crystals or aggregates of inorganic substances, metal particles, or particles of metal compounds such as metal oxides, metal sulfides, and metal nitrides. Moreover, the examples include particles of rubber materials, waxes (particulate wax) and hollow particles.

As the polymer particles, concretely mentioned are particles of polyvinylbutyral resins, polyvinylacetal resins, polyarylate resins, polycarbonate resins, polyester resins, phenoxy resins, polyvinyl chloride resins, polyvinylidene chloride resins, polyvinyl acetate resins, polystyrene resins, acrylic resins, metacrylic resins, styrene-acrylic resins, styrene-metacrylic resins, polyacrylamide resins, polyamide resins, polyvinylpyridine resins, cellulosic resins, polyurethane resins, epoxy resins, silicone resins, polyvinyl alcohol resins, caseins, vinyl chloride-vinyl acetate copolymers, modified vinyl chloride-vinyl acetate copolymers, vinyl chloride-vinyl acetate-maleic anhydride copolymers, styrene-butadiene copolymers, vinylidene chloride-acrylonitrile copolymers, styrene-alkyd resins, phenol-formaldehyde resins, etc.

Moreover, as the example of the metal or metal compound particles include particles made of carbon black; metals such as zinc, aluminum, copper, iron, nickel, chromium, and titanium, or alloys thereof; metal oxides such as $TiO_2$, $SnO_2$, $Sb_2O_3$, $In_2O_3$, ZnO, MgO, and iron oxide and compounds thereof; metal nitrides such as silicon nitride; and combinations thereof.

As the particles of the rubber materials, nitrile rubber, styrene rubber, and isobutylene rubber that have been particulated can be used. Particulation can be conducted by emulsion polymerization, or by a mechanical process such as freezing/cooling pulverization.

As the particulate wax, one made into fine particles by any one of the conventionally known processes using an emulsifying and dispersing apparatus and the like, described in Report-1 of Research Group on Reaction Engineering, "Emulsion/Dispersion Technology and Particle Size Control of Polymer Fine Particles, Chapter 3," published by The Society of Polymer Science, Japan, in March 1995 can be used.

Furthermore, as the above-mentioned wax particles, it is possible to use wax particles (mold-releasing agent) obtained using a method in which a mold-releasing agent is added to an appropriate solvent that is compatible with the mold-releasing agent during warming and does not allow the mold-releasing agent to be dissolved at room temperature, the mold-releasing agent is dissolved under heating, and the mixture is gradually cooled to room temperature to allow the particles of the mold-releasing agent to be deposited (the dissolution-deposition method) or using a method in which a mold-releasing agent is evaporated under heating in an inert gas, such as helium, to produce particles in the gas phase, and the particles are cooled and collected by allowing them to attach to a film or the like and then dispersed into a solvent (the gas-phase evaporation method).

In the production of the above-mentioned wax particles, further microparticulation may be attained when the above-mentioned method is combined with a mechanical pulverization method in which a medium or the like is used.

Examples of resin serving as the material of the above-mentioned wax particles include low-molecular-weight polypropylene, low-molecular-weight polyethylene, etc. and waxes, i.e., plant-based waxes, such as carnauba wax, cotton wax, wood wax and rice wax, animal-based waxes, such as yellow beeswax and lanolin, mineral-based waxes, such as ozokerite and selsyn, and petroleum waxes, such as paraffin, microcrystalline and petrolactam. In addition to these natural waxes, synthetic hydrocarbon waxes, such as Fischer-Tropsch wax, are also included. Among these waxes, low-molecular-weight polypropylene, low-molecular-weight polyethylene, carnauba wax and paraffin are used preferably as resin serving as the material of the above-mentioned wax particles.

Inorganic/organic hollow particles may be used as the above-mentioned hollow particles. Silica-based and silica-alumina-based hollow particles are preferably used as inorganic hollow particles, and resin-based hollow particles are preferably used as inorganic hollow particles. Furthermore, the number of voids inside a particle may be singular or multiple. The porosity thereof, not limited particularly, is preferably 20 to 80%, more preferably 30 to 70%. More specifically, examples of the hollow particles include inorganic hollow particles, such as Fillite produced by Japan Fillite Co., Ltd. and Cenolite produced by TOMOE Engineering Co., Ltd., and organic hollow particles, such as Expancel produced by Japan Fillite Co., Ltd., ADVAN CELL produced by Sekisui Chemical Co., Ltd., SX866(A) and SX866(B) produced by JSR Corporation and Nipol MH5055 produced by Nippon Zeon Co., Ltd. Among these, Expancel of Japan Fillite Co., Ltd. is preferably used as the above-mentioned hollow particles. In particular, thermally expandable particles, such as Expancel DU, are expanded to a desired size by appropriate heating before use.

Furthermore, there are a variety of preparation methods for these particles, and fine particles prepared by synthesis in a liquid medium may be directly subjected to particle classification, or particles prepared by mechanically pulverizing bulk material may be dispersed in a liquid medium. In this case, the material is usually pulverized in a liquid medium, and particles are directly classified.

On the other hand, when particles (powder) prepared in a dry process are classified, it is necessary to previously disperse the powder in a liquid medium. For dispersing the dry powder in the medium, a method using a sand mill, a colloid mill, an attritor, a ball mill, a Dyno mill, a high-pressure homogenizer, an ultrasonic disperser, a co-ball mill, a roll mill, or the like can be mentioned. At this time, it is preferable to carry out the method under conditions where the primary particles are not pulverized by dispersion.

In the exemplary embodiment of the present invention, the content of the particles in the particle dispersion liquid is preferably from 0.001% to 40% by volume, and more preferably, from 0.01% to 25% by volume. If the content of the particles in the particle dispersion liquid is 0.001% by volume or more, recovery of the particles is satisfactory, and if the content is 40% by volume or less, clogging hardly occurs, and thus the content within the above-mentioned range is preferable.

Also, in the exemplary embodiment of the present invention, the volume average particle diameters of the particles are measured using a Coulter counter TA-II (manufactured by Beckman Coulter, Inc.) except for the case of the following particle diameters (5 µm or less). In this case, depending on the particle diameter level of the particles, an optimal aperture was used for measurement. However, when the particle diameters of the particles were 5 µm or less, the particle diameters are measured using a laser diffraction scattering type particle size distribution meter (LA-920, HORIBA, Ltd.)

Hereinafter, description will be given of the exemplary embodiment of the present invention while referring to the drawings.

Figure 6:
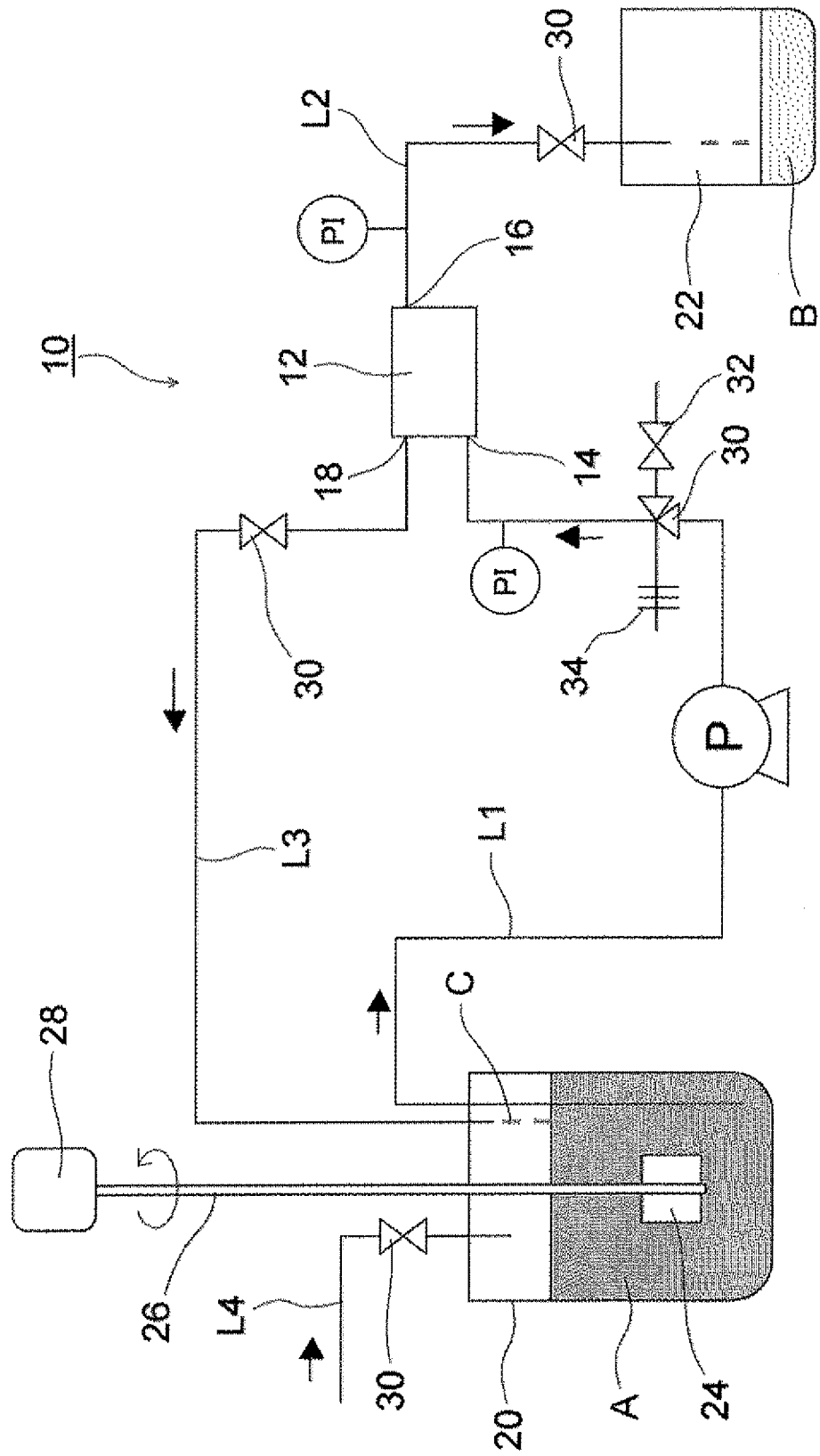
FIG. 6 is a conceptual diagram showing a mode of the separation apparatus of the exemplary embodiment of the present invention.

FIG. 6 is a conceptual diagram showing a mode of the separation apparatus of the exemplary embodiment of the present invention.

The separation apparatus 10 shown in FIG. 6 has a microchannel device 12 of the exemplary embodiment of the present invention. The microchannel device 12 has one supply port 14 and two discharge ports 16 and 18. The supply port 14 is supplied with a fluid A in a container 20 via a fluidic channel L1. The discharge port 16 is connected with a fluidic channel L2, which allows storing a separated fluid B in a container 22. Moreover, the discharge port 18 is connected with a fluidic channel L3, which allows returning a separated fluid C to the container 20.

The separation apparatus 10 shown in FIG. 6 may separate the fluid A into the fluid B and the fluid C by using the microchannel device 12 of the exemplary embodiment of the present invention. The supply port 14 and the discharge port 16 are connected through a filtration diaphragm, and the supply port 14 and the discharge port 18 are connected without passing through a filtration diaphragm.

The container 20 may include stirring means and the like, and for example, a motor 28 including a stirring blade 24 and a rotary shaft 26 as shown in FIG. 6 may be exemplified.

Moreover, the container 20 may include supply means and the like, and in the separation apparatus shown in FIG. 6, a desired fluid, solid, etc., may be supplied through a fluidic channel L4.

The fluidic channels L1 to L4 may include pressure regulating means. For example, as shown in FIG. 6, the fluidic channel L1 includes a pump P, a pressure detector PI, a valve 30, a safety valve 32, and a back pressure valve 34. Moreover, each of the fluidic channels L2 to L4 includes a valve 30, and the fluidic channel L2 further includes a pressure detector PI.

Figure 7:
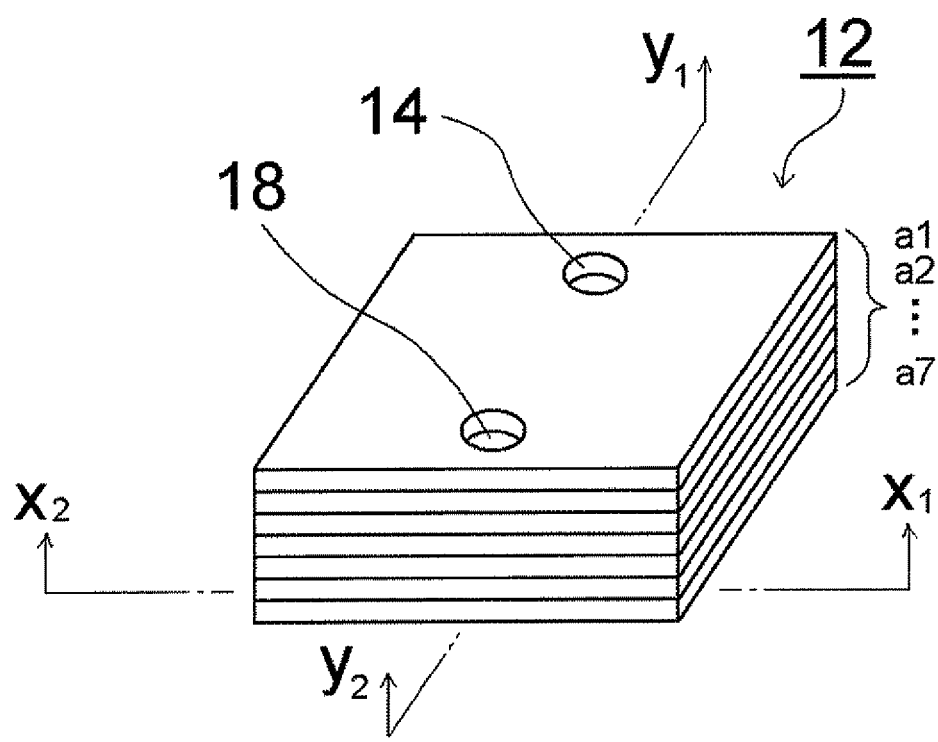
FIG. 7 is a schematic view showing a microchannel device 12 being a mode of the microchannel device of the exemplary embodiment of the present invention.

FIG. 7 is a schematic view showing the microchannel device 12 being a mode of the microchannel device of the exemplary embodiment of the present invention.

The microchannel device 12 shown in FIG. 7, for which thin-film pattern substrates a1 to a7 are laminated in order, has a supply port 14 and a discharge port 18 at a face of the side of the thin-film pattern substrate a1, and has a discharge port 16 (not shown) at a face of the side of the thin-film pattern substrate a7.

The microchannel device 12 can be easily produced by laminating thin-film pattern substrates by electroforming to be described later. Hereinafter, the "thin-film pattern substrate" is simply referred to also as a "thin-film pattern."

Figure 8:
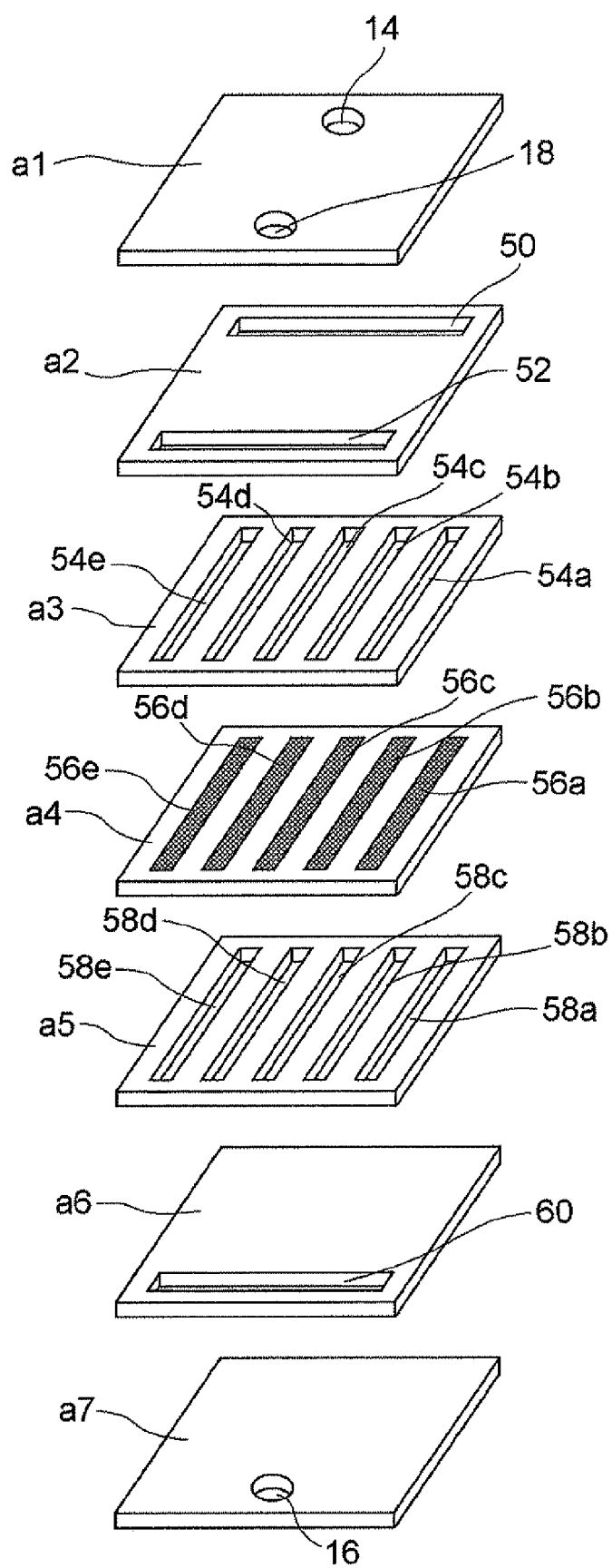
FIG. 8 is a schematic view showing thin-film patterns a1 to a7 that form the microchannel device 12.

FIG. 8 is a schematic view showing the thin-film patterns a1 to a7 that form the microchannel device 12.

Figure 9:
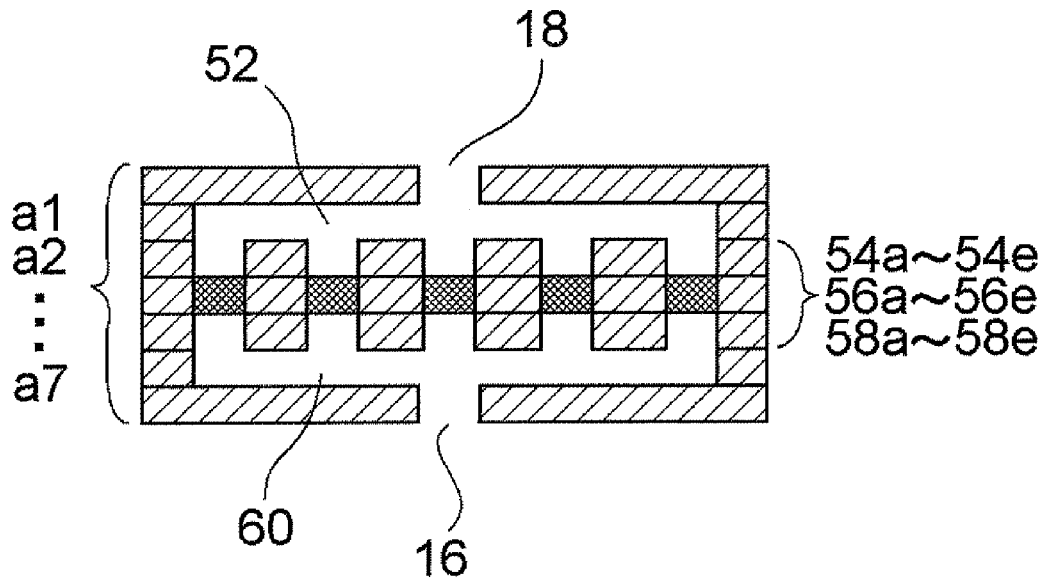
FIG. 9 is a sectional schematic view of the microchannel device 12 shown in FIG. 7 cut along a plane $x_1$-$x_2$ passing through discharge ports 16 and 18.

FIG. 9 is a sectional schematic view of the microchannel device 12 shown in FIG. 7 cut along a plane $x_1$-$x_2$ passing through the discharge ports 16 and 18.

Figure 10:
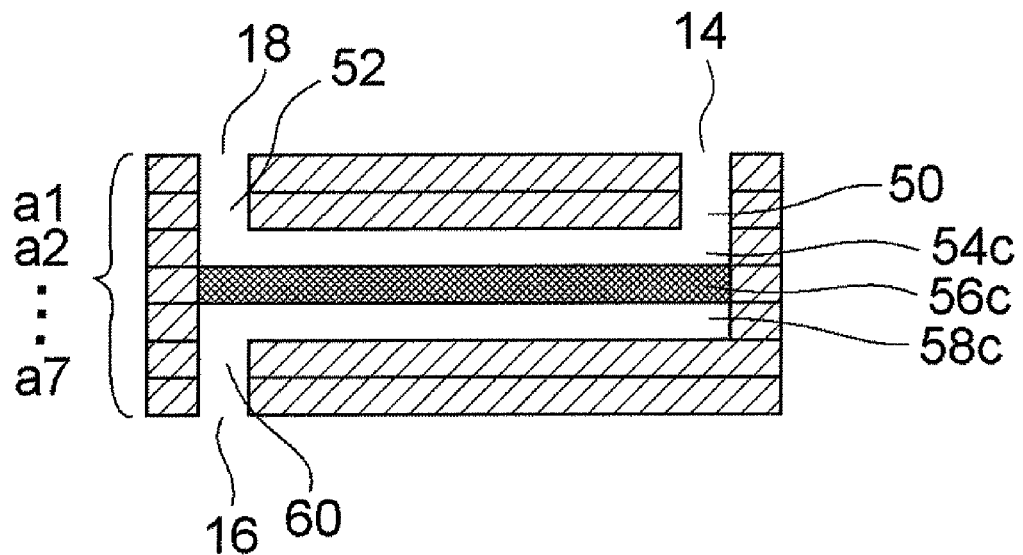
FIG. 10 is a sectional schematic view of the microchannel device 12 shown in FIG. 7 cut along a plane $y_1$-$y_2$ passing through a central part of the microchannel device.

FIG. 10 is a sectional schematic view of the microchannel device 12 shown in FIG. 7 cut along a plane $y_1$-$y_2$ passing through a central part of the microchannel device.

The thin-film pattern a1 is provided with two opening portions (a supply port 14 and a discharge port 18) whose sections are circular.

The thin-film pattern a2 is provided with two opening portions (fluidic channels 50 and 52) whose sections are rectangular. The fluidic channel 50 is provided so as to connect with the supply port 14 at its central portion, and the fluidic channel 52 is provided so as to connect with the discharge port 18 at its central portion.

The thin-film pattern a3 is provided with five opening portions (fluidic channels 54a to 54e) whose sections are rectangular. The fluidic channels 54a to 54e are respectively provided so as to connect with the fluid paths 50 and 52 at their end portions. In addition, particularly, the fluidic channel 54a is provided so as to connect with an end portion of the fluidic channel 50 and an end portion of the fluidic channel 52, and the fluidic channel 54e is provided so as to connect with an end portion at the side opposite to the foregoing of the fluidic channel 50 and an end portion at the side opposite to the foregoing of the fluidic channel 52.

The thin-film pattern a4 is provided with filtration diaphragms 56a to 56e. The filtration diaphragms 56a to 56e are the same in shape as the fluidic channels 54a to 54e, respectively.

The thin-film pattern a5 is provided with five opening portions (fluidic channels 58a to 58e) whose sections are rectangular, and the positions and shapes thereof are the same as those of the thin-film pattern a3.

The thin-film pattern a6 is provided with one opening portion (a fluidic channel 60) whose section is rectangular. The fluidic channel 60 is provided so as to connect with the respective end portions of the fluidic channels 58a to 58e, and is provided particularly, with the fluidic channel 58a, so as to connect at an end portion of the fluidic channel 60, and with the fluidic channel 58e, so as to connect at an end portion of the side opposite to the foregoing of the fluidic channel 60.

The thin-film pattern a7 is provided with one opening portion (a discharge port 16) whose section is circular. The discharge port 16 is provided so as to connect with a central portion of the fluidic channel 60.

Figure 11:
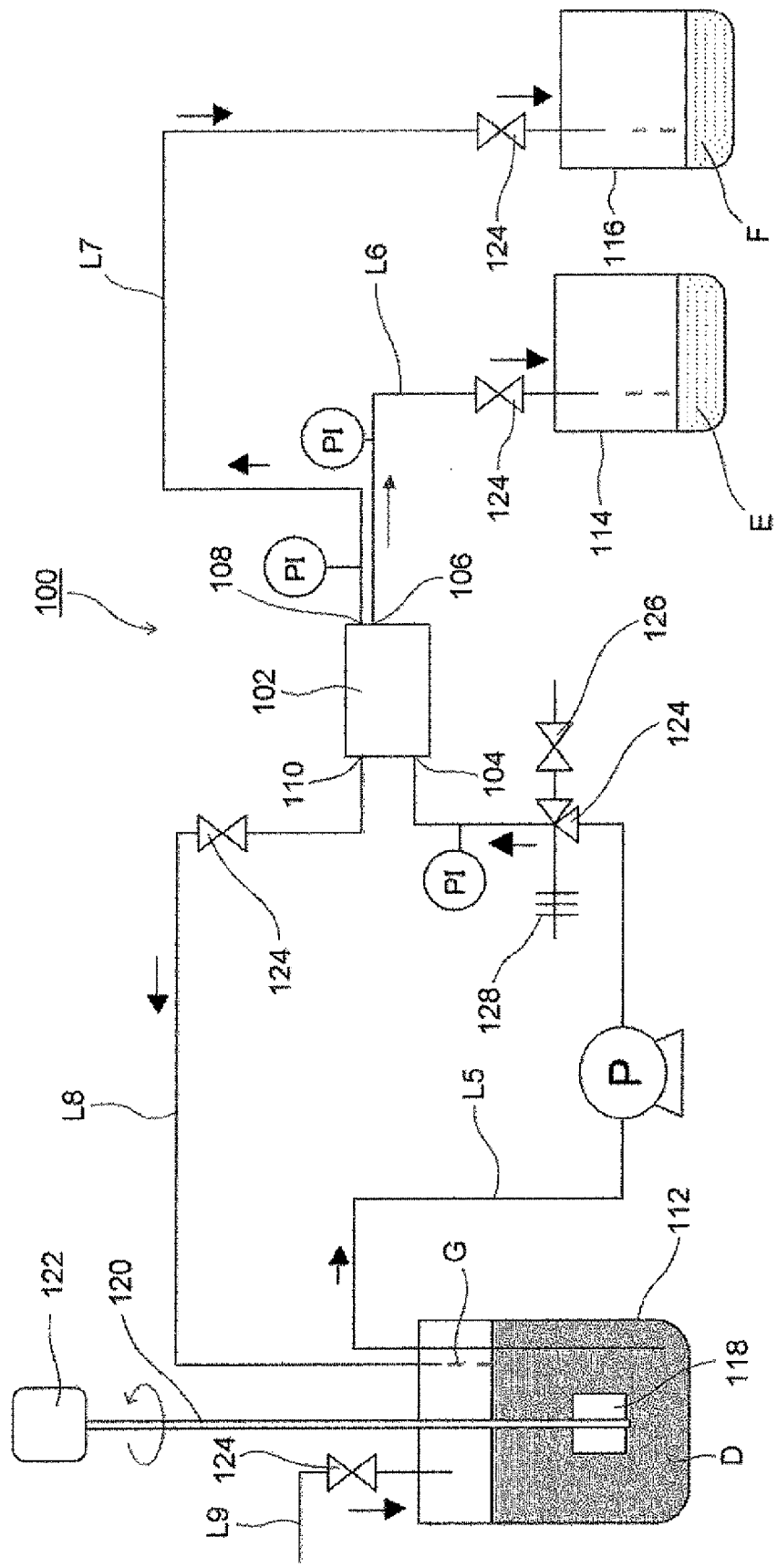
FIG. 11 is a conceptual diagram showing another mode of the separation apparatus of the exemplary embodiment of the present invention.

FIG. 11 is a conceptual diagram showing another mode of the separation apparatus of the exemplary embodiment of the present invention.

The separation apparatus 100 shown in FIG. 11 has a microchannel device 102 of the exemplary embodiment of the present invention. The microchannel device 102 has one supply port 104 and three discharge ports 106, 108, and 110. The supply port 104 is supplied with a fluid D in a container 112 via a fluidic channel L5. The discharge port 106 is connected with a fluidic channel L6, which allows storing a separated fluid E in a container 114. Moreover, the discharge port 108 is connected with a fluidic channel L7, which allows storing a separated fluid F in a container 116. Moreover, the discharge port 110 is connected with a fluidic channel L8, which allows returning a separated fluid G to the container 112.

The separation apparatus 100 shown in FIG. 11 may separate the fluid D into the fluid E, the fluid F, and the fluid G by using the microchannel device 102 of the exemplary embodiment of the present invention. The supply port 104 and the discharge port 106 are connected through two filtration diaphragms, the supply port 104 and the discharge port 108 are connected through one filtration diaphragm, and the supply port 104 and the discharge port 110 are connected without passing through a filtration diaphragm.

The container 112 may include stirring means and the like, and for example, a motor 122 including a stirring blade 118 and a rotary shaft 120 as shown in FIG. 11 can be exemplified.

Moreover, the container 112 may include supply means and the like, and in the separation apparatus shown in FIG. 11, a desired fluid, particles, etc., can be supplied through a fluidic channel L9.

The fluidic channels L5 to L9 can include pressure adjusting means. For example, as shown in FIG. 11, the fluidic channel L5 includes a pump P, a pressure detector PI, a valve 124, a safety valve 126, and a back pressure valve 128. Moreover, each of the fluidic channels L6 to L9 includes a valve 124, and the fluidic channel L6 and the fluidic channel L7 further include pressure detectors PI.

Figure 12:
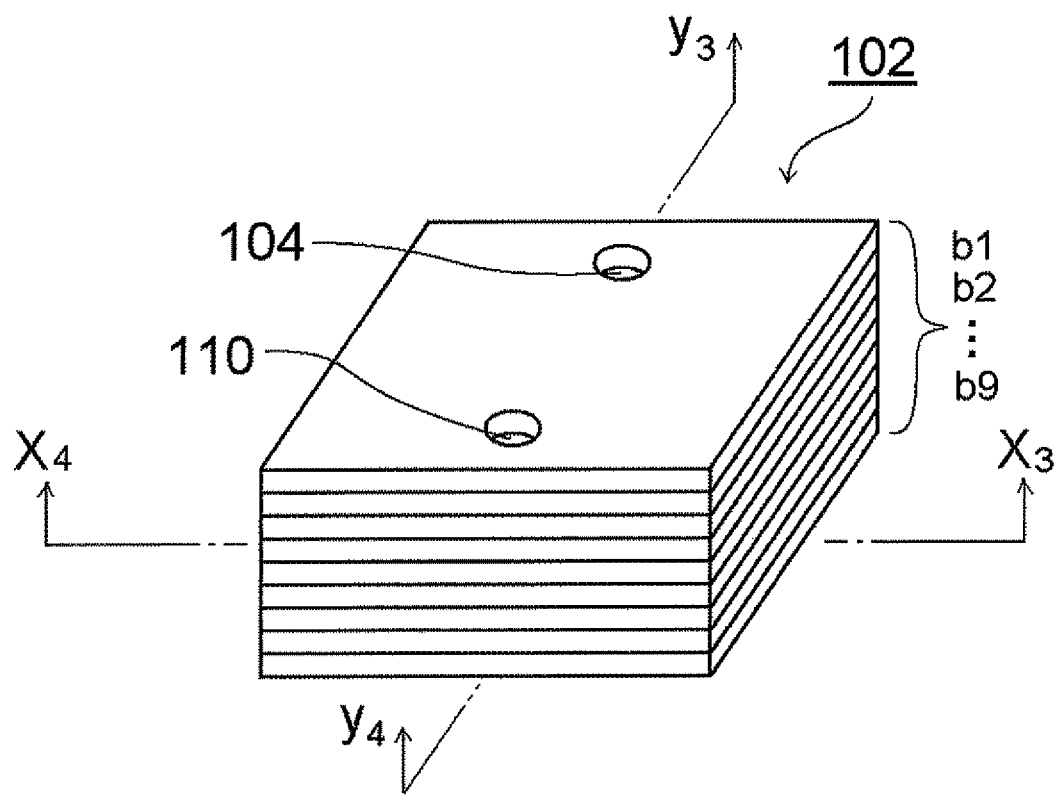
FIG. 12 is a schematic view showing a microchannel device 102 being another mode of the microchannel device of the exemplary embodiment of the present invention.

FIG. 12 is a schematic view showing the microchannel device 102 being another mode of the microchannel device of the exemplary embodiment of the present invention.

The microchannel device 102 shown in FIG. 12, for which thin-film patterns b1 to b9 are laminated in order, has a supply port 104 and a discharge port 110 at a face of the side of the thin-film pattern b1, and has discharge ports 106 and 108 (not shown) at a face of the side of the thin-film pattern b9.

The microchannel device 102 may be easily produced by laminating thin-film patterns by electroforming to be described later.

Figure 13:
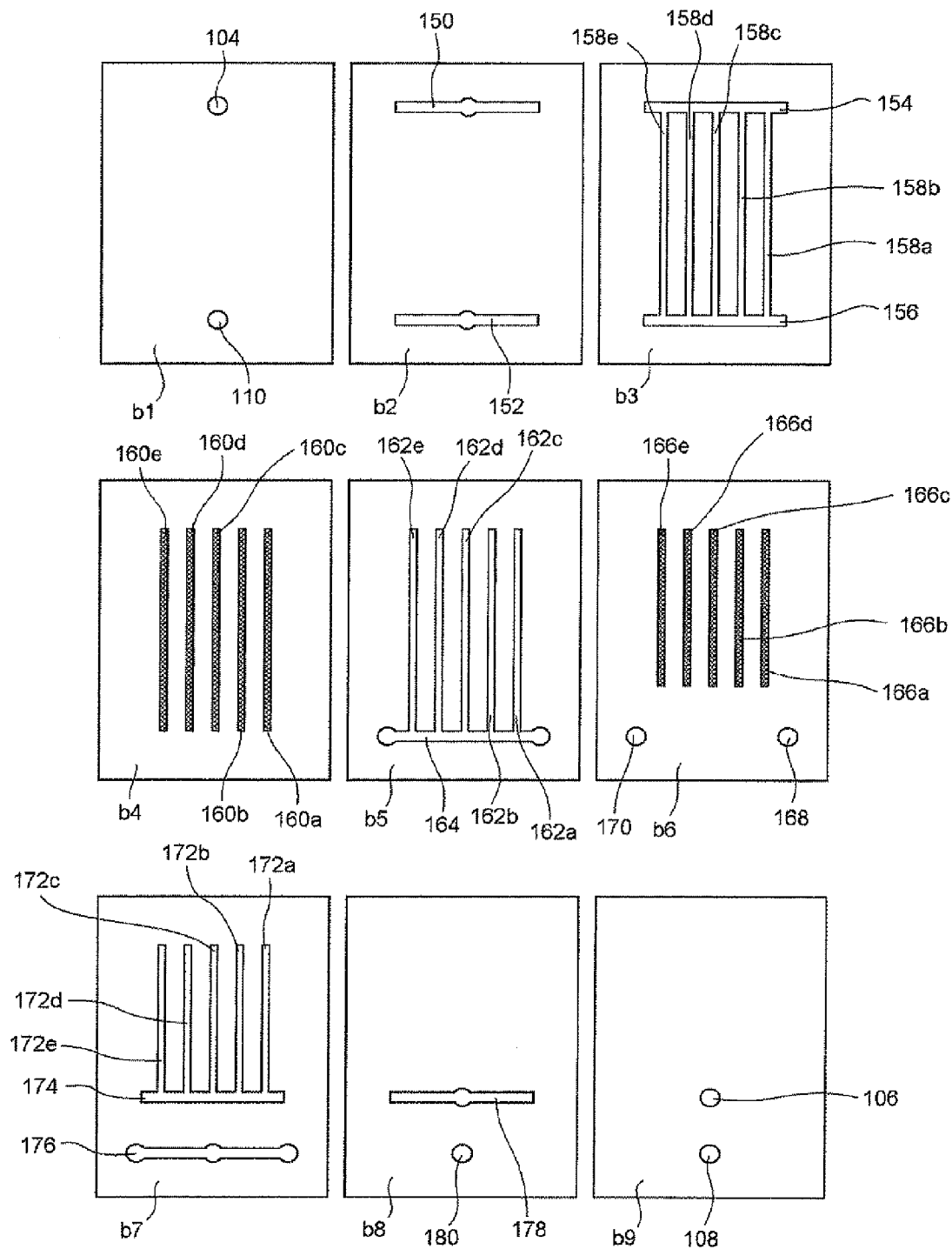
FIG. 13 is a top schematic view showing thin-film patterns b1 to b9 that form the microchannel device 102.

FIG. 13 is a top schematic view showing the thin-film patterns b1 to b9 that form the microchannel device 102.

Figure 14:
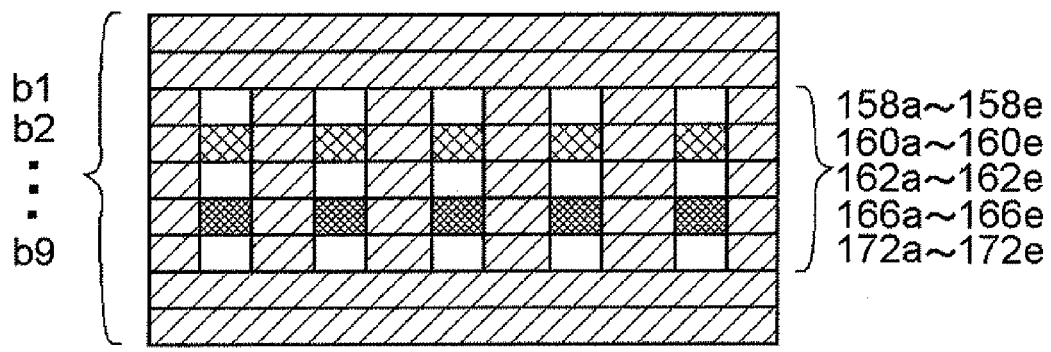
FIG. 14 is a sectional schematic view of the microchannel device 102 shown in FIG. 12 cut along a plane $x_3$-$x_4$ passing through a central part of the microchannel device.

FIG. 14 is a sectional schematic view of the microchannel device 102 shown in FIG. 12 cut along a plane $x_3$-$x_4$ passing through a central part of the microchannel device.

Figure 15:
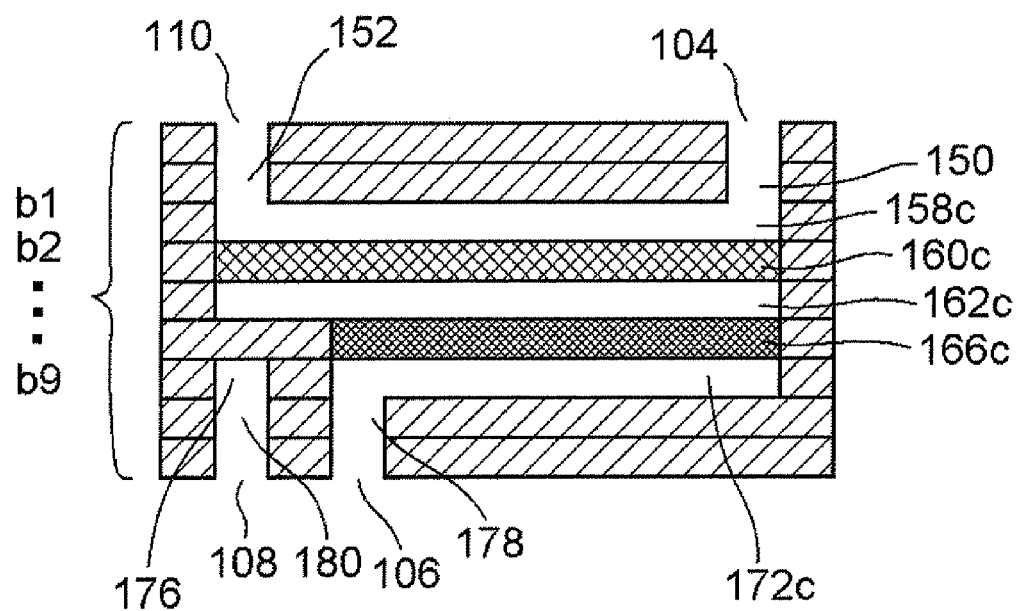
FIG. 15 is a sectional schematic view of the microchannel device 102 shown in FIG. 12 cut along a plane $y_3$-$y_4$ passing through a central part of the microchannel device.

FIG. 15 is a sectional schematic view of the microchannel device 102 shown in FIG. 12 cut along a plane $y_3$-$y_4$ passing through a central part of the microchannel device.

The thin-film pattern b1 is provided with two opening portions whose sections are circular, that is, two cylindrical opening portions (a supply port 104 and a discharge port 110).

The thin-film pattern b2 is provided with two opening portions (fluidic channels 150 and 152) whose sections have rectangular shapes swollen at central portions in circular forms. The fluidic channel 150 is provided so as to connect with the supply port 104 at its circular part of the central portion, and the fluidic channel 152 is provided so as to connect with the discharge port 110 at its circular part of the central portion.

The thin-film pattern b3 is provided with two opening portions (fluidic channels 154 and 156) whose sections are rectangular, and is provided with five opening portions (fluidic channels 158a to 158e) whose sections are rectangular for connecting the fluidic channel 154 and the fluidic channel 156.

The respective fluidic channels 158a to 158e have equal intervals therebetween. In addition, the fluidic channel 154 is provided so as to connect with the fluid path 150, and the fluidic channel 156 is provided so as to connect with the fluid path 152.

The thin-film pattern b4 is provided with five filtration diaphragms 160a to 160e whose sections are rectangular, which are the same in shape as the fluidic channels 158a to 158e, respectively. The filtration diaphragms 160a to 160e are provided so as to connect with the fluidic channels 158a to 158e, respectively.

The thin-film pattern b5 is provided with five opening portions (fluidic channels 162a to 162e) whose sections are rectangular, and is further provided with one opening portion (a fluidic channel 164) whose section has a rectangular shape swollen at both end portions in circular forms, which is connected at the respective end portions of the fluidic channels 162a to 162e. The fluidic channels 162a to 162e are provided so as to connect with the filtration diaphragms 160a to 160e, respectively.

The thin-film pattern b6 is provided with five filtration diaphragms 166a to 166e whose sections are rectangular, which are the same in shape as the filtration diaphragms 160a to 160e except that the long side from one end portion thereof is shorter in length. The filtration diaphragms 166a to 166e are provided so as to connect with the fluidic channels 162a to 162e, respectively. Moreover, the thin-film pattern b6 is provided with two opening portions (fluidic channels 168 and 170) whose sections are circular. The fluidic channels 168 and 170 are provided so as to connect with the two end portions of the fluidic channel 164 swollen in circular forms.

The filtration diaphragms 160a to 160e have a pore diameter larger than that of the filtration diaphragms 166a to 166e.

The thin-film pattern b7 is provided with five opening portions (fluidic channels 172a to 172e) whose sections are rectangular, which are the same in shape as the filtration diaphragms 166a to 166e, respectively, and is further provided with one opening portion (a fluidic channel 174) whose section is rectangular, which is connected at the respective end portions of the fluidic channels 172a to 172e. The filtration diaphragms 172a to 172e are provided so as to connect with the filtration diaphragms 166a to 166e, respectively. Moreover, the thin-film pattern b7 is provided with one opening portion (a fluidic channel 176) whose section has a rectangular shape swollen at a central portion and both end portions in circular forms. The fluidic channel 176 is provided so as to connect at end portions with the fluidic channels 168 and 170, respectively.

The thin-film pattern b8 is provided with one opening portion (a fluidic channel 178) whose section has a rectangular shape swollen at a central portion in a circular form. The fluidic channel 178 is provided so as to connect with the fluidic channel 174. Moreover, the thin-film pattern b8 is provided with one opening portion (a fluidic channel 180) whose section is circular. The fluidic channel 180 is provided so as to connect with the central portion of the fluidic channel 176 swollen in a circular form.

The thin-film pattern b9 is provided with two opening portions (discharge ports 106 and 108) whose sections are circular. The discharge port 106 is provided so as to connect with the central portion of the fluidic channel 178 swollen in a circular form, and the discharge port 108 is provided so as to connect with the fluidic channel 180.

As a result of using the microchannel device 102 shown in FIG. 13, when, for example, the filter pore diameter of the filtration diaphragms 160a to 160e are set large, the filter pore diameter of the filtration diaphragms 166a to 166e are set small, and a fluid containing particles of various particle diameters is introduced from the supply port 104, a fluid containing particles of small average particle diameters is discharged from the discharge port 106, and from the discharge port 108, a fluid containing particles of intermediate average particle diameters is discharged, and from the discharge port 110, a fluid containing particles of large average particle diameters is discharged.

Figure 16:
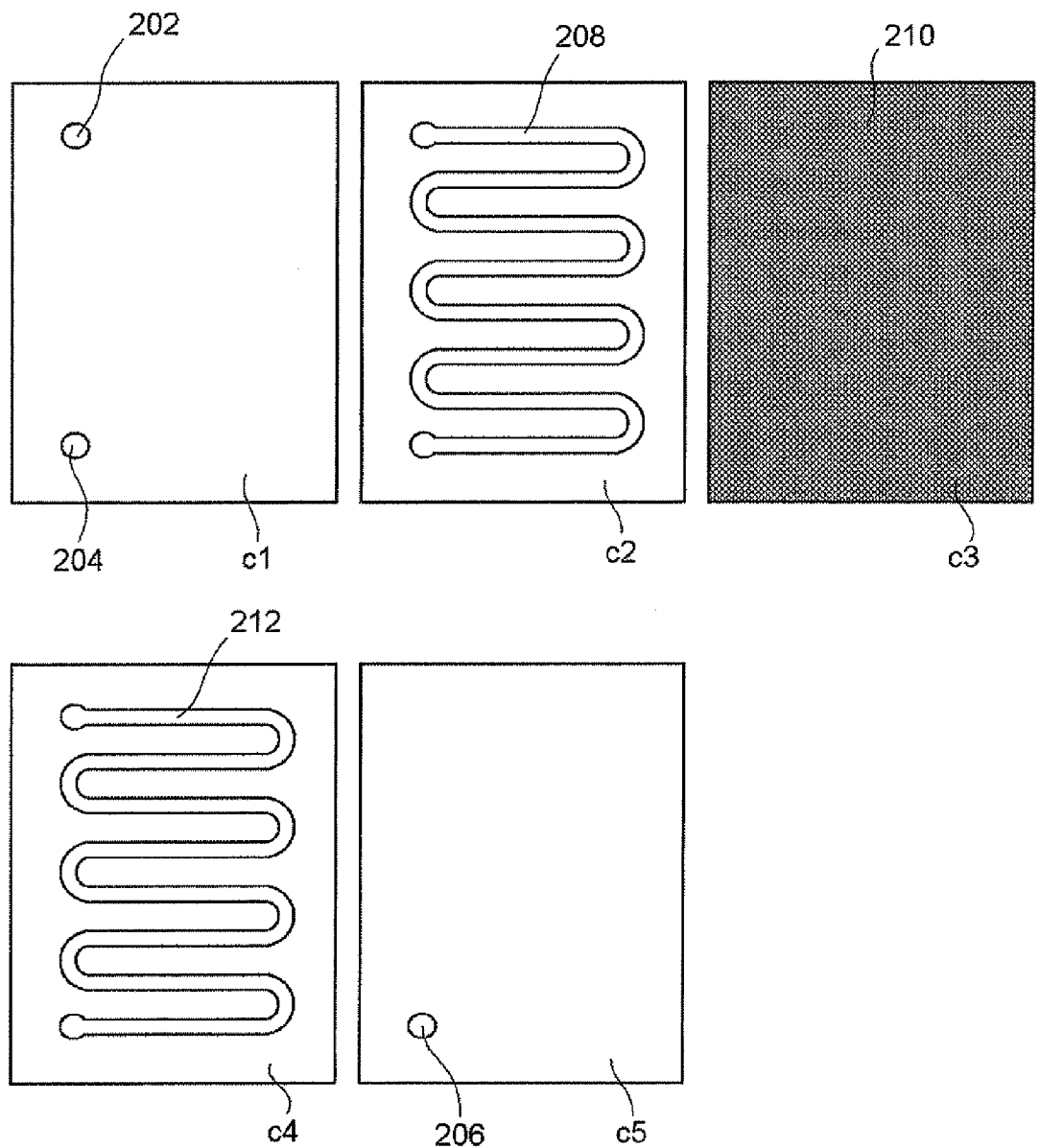
FIG. 16 is a top schematic view showing thin-film patterns c1 to c5 that form a microchannel device being another mode of the microchannel device of the exemplary embodiment of the present invention.

FIG. 16 is a top schematic view showing thin-film patterns c1 to c5 that form a microchannel device being another mode of the microchannel device of the exemplary embodiment of the present invention.

The microchannel device, for which thin-film patterns c1 to c5 are laminated in order, has a supply port 202 and a discharge port 204 at a face of the side of the thin-film pattern c1, and has a discharge port 206 at a face of the side of the thin-film pattern c5.

The microchannel device may be easily produced, particularly, when a resilient filter having high adhesion like a resin-made honeycomb filter is used, by sandwiching the filter between two substrates having such fluidic channel patterns as shown in FIG. 16 and fixing the same by tightening with a fixing jig.

For the microchannel device shown in FIG. 16, whose fluidic channels are wavy, a filtration diaphragm is provided parallel to the fluidic channel direction. Moreover, by forming the fluidic channels wavy, the fluidic channel length per area of the microchannel device can be extended, so that separation efficiency may be further improved.

The thin-film pattern c1 is provided with two opening portions (a supply port 202 and a discharge port 204) whose sections are circular.

The thin-film pattern c2 is provided with one opening portion (a fluidic channel 208) whose sectional shape is swollen at two end portions in circular forms and has a waveform whose width is constant. The fluidic channel 208 is provided so as to connect at the respective end portions with the supply port 202 and the discharge port 204, respectively.

The thin-film pattern c3 is a filtration diaphragm 210 in its entirety.

The thin-film pattern c4 is provided with one opening portion (a fluidic channel 212) whose shape is identical to that of the thin-film pattern c2 and whose sectional shape is swollen at two end portions in circular forms and has a waveform whose width is constant.

The thin-film pattern c5 is provided with one opening portion (a discharge port 206) whose section is circular. The discharge port 206 is provided so as to connect with one end portion of the fluidic channel 212.

A manufacturing method for the microchannel device of the exemplary embodiment of the present invention is not particularly limited, and it may be produced by any publicly known method.

The microchannel device of the exemplary embodiment of the present invention may also be produced on a solid substrate by a microfabrication technology.

Examples of a material to be used as the solid substrate include metal, silicon, Teflon (registered trademark), glass, ceramic, and plastic. Among theses metal, silicon, Teflon (registered trademark), glass, and ceramic are preferable from the point of view of heat resistance, pressure resistance, solvent resistance, and optical transparency, and glass is particularly preferable.

Examples of the microfabrication technology for producing fluidic channels include methods described in "Microreactors, Epoch-making Technology for Synthesis" (published in 2003 by CMC Publishing Co., Ltd., under the supervision of Junichi YOSHIDA)," "Microfabrication Technology, Applied edition, —Application to Photonics/Electronics/Mechatronics—" (published in 2003 by NTS Inc., edited by Event Committee of Society of Polymer Science, Japan), etc.

As representative methods thereof, there can be mentioned a LIGA technology using X-ray lithography, a high-aspect ratio photolithography method using EPON SU-8, a micro-electrical discharge machining method (μ-EDM), a high-aspect-ratio processing method of silicon by deep RIE, a Hot Emboss processing method, stereolithography, a laser processing method, anion beam processing method, and a mechanical micro-cutting method using a micro-tool formed of a hard material such as diamond. These technologies may be used alone or in combination. Of these microfabrication technologies, preferred are a LIGA technology using X-ray lithography, a high-aspect ratio photolithography method using EPON SU-8, a micro-electrical discharge machining method (μ-EDM), and a mechanical micro-cutting method.

The fluidic channel to be used in the exemplary embodiment of the present invention can also be produced by pouring a resin into a mold using a pattern formed on a silicon wafer with use of a photoresist and then solidifying the resin (a molding method). In the molding method, a silicon resin represented by polydimethylsiloxane (PDMS) or a derivative thereof can be used.

Also, when manufacturing the microchannel device of the present invention, a bonding technology can be used. An ordinary bonding technology is roughly divided into solid phase bonding and liquid phase bonding, and as for bonding methods commonly used, representative examples of the solid phase bonding method include pressure welding and diffusion bonding, and representative examples of the liquid phase bonding include welding, eutectic bonding, soldering, and adhesion.

Furthermore, the bonding is preferably performed according to a highly precise bonding method, with the dimensional accuracy kept, not involving fracture of a microstructure such as a fluidic channel due to deterioration or deformation of the material under high-temperature heating, and examples of the technology therefor include silicon direct bonding, anodic bonding, surface activation bonding, direct junction using hydrogen bonding, bonding using an aqueous HF solution, Au—Si eutectic bonding, and void-free adhesion.

The microchannel device of the exemplary embodiment of the present invention is preferably formed by laminating pattern substrates (thin-film pattern substrates). The thickness of the pattern substrate is preferably 1 μm to 50 μm, and more preferably, 5 μm to 30 μm.

The microchannel device of the exemplary embodiment of the present invention is preferably one formed by laminating pattern substrates formed with predetermined two-dimensional patterns, and more preferably, the pattern substrates are laminated with their faces bonded in direct contact.

As a preferred manufacturing method for the microchannel device of the exemplary embodiment of the present invention, it is preferable to produce the same using an electroforming process, and for example, a manufacturing method for a microchannel device including the steps of:

(i) forming, on a first substrate, a plurality of pattern substrates corresponding to each sectional shape of a desired microchannel device (a donor substrate producing step); and (ii) transferring the plurality of pattern substrates on the first substrate onto a second substrate by repeating bonding and separation of the first substrate formed with the plurality of pattern substrates and the second substrate (a bonding step) can be exemplified, and reference can be made to the manufacturing method described in Japanese Published Unexamined Patent Application No. 2006-187684.

The manufacturing method for the microchannel device of the exemplary embodiment of the present invention will be described in detail.

The donor substrate in the donor substrate producing step means a substrate for which formed, on a first substrate, a plurality of pattern substrates corresponding to each sectional shape of a desired microchannel device. The first substrate is preferably formed of metal, ceramic, or silicon, and a metal such as stainless steel can be favorably used. First, the first substrate is prepared, a thick-film photoresist is applied onto the first substrate, and by light exposure via a photomask corresponding to each sectional shape of a microchannel device to be produced, the photoresist is developed to form a positively and negatively inverted resist pattern of each sectional shape. Next, the substrate having the resist pattern is immersed in a plating bath to allow, for example, a nickel plating to grow on the surface of the metallic substrate not covered with the photoresist. A pattern substrate is preferably formed of copper or nickel by using electroforming.

Next, by removing the resist pattern, a pattern substrate corresponding to each sectional shape of the microchannel device is formed on the first substrate.

The bonding step is a step of transferring a plurality of pattern substrates on the first substrate (donor substrate) onto a second substrate (target substrate) by repeating bonding and separation of the first substrate formed with the plurality of pattern substrates and the second substrate. The bonding is preferably performed by room temperature bonding. The "room temperature bonding" means directly bonding atoms at room temperature. According to the room temperature bonding, there is a small change in shape and thickness of the thin films to be bonded at room temperature, and a highly accurate mechanical device can be obtained.

Moreover, it is preferable, prior to bonding the thin-film pattern substrates, to irradiate the surfaces thereof with neutral atomic beams, ion beams, or the like so as to purify the surfaces. The purification activates the surfaces so that strong bonding can be obtained.

FIGS. 17A to 17F is a manufacturing process drawing showing a mode of a manufacturing method for a microchannel device that can be favorably used for the exemplary embodiment of the present invention.

Figure 17A:
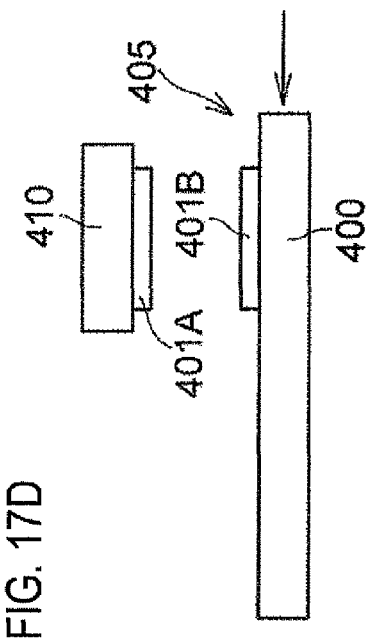
FIGS. 17A to 17F are manufacturing process drawings showing a mode of the manufacturing method for a microchannel device that can be favorably used for the exemplary embodiment of the present invention.

Next, as shown in FIG. 17A, the above-mentioned donor substrate 405 is arranged on a lower stage (not shown) in a vacuum chamber, and a target substrate 410 is arranged on an upper stage (not shown) in the vacuum chamber. Then, the vacuum chamber is evacuated and brought into a high vacuum condition or ultrahigh vacuum condition. Next, the lower stage is moved relative to the upper stage to locate a first-layer pattern substrate 401A of the donor substrate 405 directly below the target substrate 410. Next, the surface of the target substrate 410 and the surface of the first-layer pattern substrate 401A are irradiated with argon atomic beams for purification.

Figure 17B:
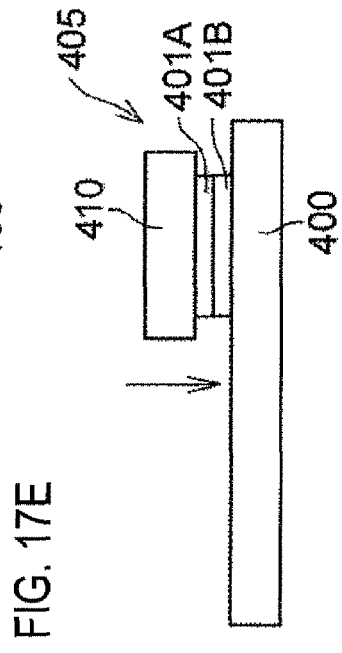

Next, as shown in FIG. 17B, the upper stage is lowered, and the target substrate 410 and the donor substrate 405 are pressed at a predetermined load force (for example, 10 kgf/cm²) for a predetermined period of time (for example, 5 minutes) to bond the target substrate 410 and the first-layer pattern substrate 410A at room temperature (surface activated bonding). In the exemplary embodiment of the present invention, the pattern substrates 401A, 401B . . . are laminated in this order.

Figure 17C:
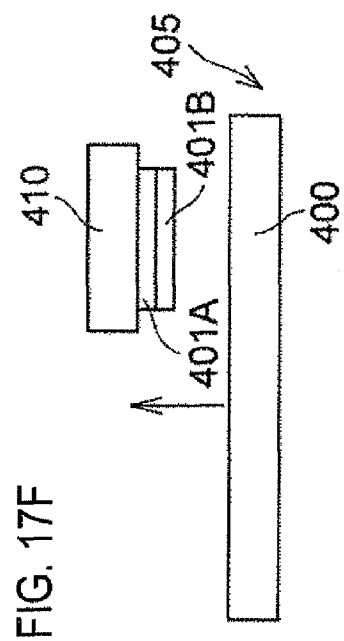

Next, when, as shown in FIG. 17C, the upper stage is raised to separate the donor substrate 405 from the target substrate 410, the first-layer pattern substrate 401A is stripped from the metallic substrate (first substrate) 400 and transferred onto the target substrate 410. This is because the adhesion strength between the first-layer pattern substrate 401A and the target substrate 410 is greater than that between the first-layer pattern substrate 401A and the metallic substrate (first substrate) 400.

Figure 17D:
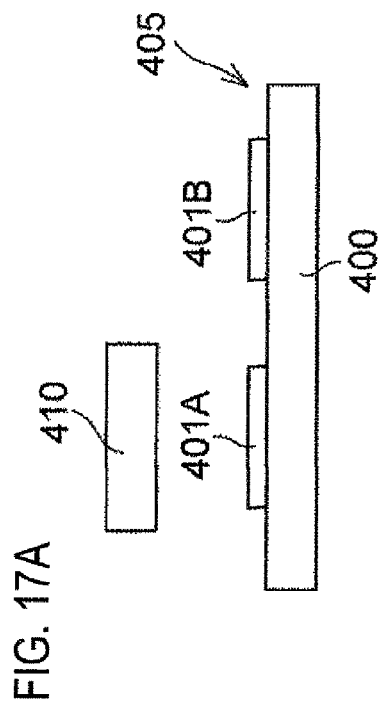

Next, as shown in FIG. 17D, the lower stage is moved to locate the second-layer pattern substrate 401B on the donor substrate 405 directly below the target substrate 410. Next, the surface of the first-layer pattern substrate 401A transferred onto the target substrate 410 (the face that has been in contact with the metallic substrate 400) and the surface of the second-layer pattern substrate 401B are purified as described above.

Figure 17E:
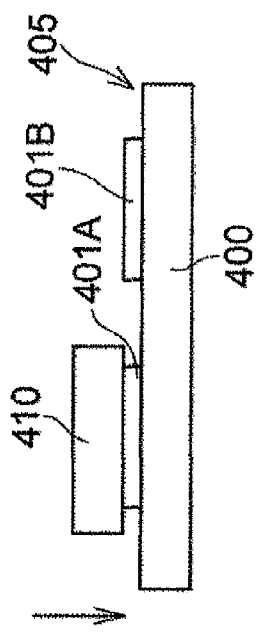
Figure 17F:
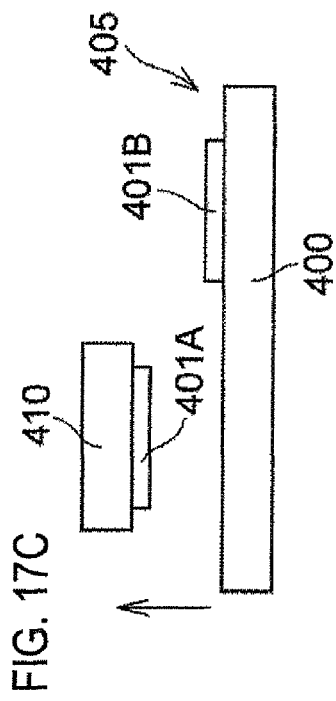

Next, when, as shown in FIG. 17E, the upper stage is lowered to bond the first-layer pattern substrate 401A and the second-layer pattern substrate 401B and, as shown in FIG. 17F, the upper stage is raised, the second-layer pattern substrate 401B is stripped from the metallic substrate (first substrate) 400 and transferred onto the target substrate 410.

For other pattern substrates as well, by repeating positioning, bonding, and separation of the donor substrate 405 and the target substrate 410, a plurality of pattern substrates corresponding to each sectional shape of a microchannel device are transferred onto the target substrate. By detaching the laminate transferred onto the target substrate 410 from the upper stage and removing the target substrate 410, a microchannel device can be obtained.

Although in the above-mentioned embodiment, the donor substrate has been produced by electroforming, it may be produced by semiconductor processing. For example, a donor substrate may also be produced by preparing a substrate made of a Si wafer, depositing, on the substrate, a mold release layer made of polyimide by a spin coating method, depositing, on the surface of the mold release layer, an Al thin film to be a construction material of a microchannel device by a sputtering method, and patterning the Al thin-film by a photolithography method.

EXAMPLES

Hereinafter, the exemplary embodiment of the present invention will be more concretely described based on examples and comparative examples, the exemplary embodiment of the present invention is by no means limited to the following examples. In the following example, "part(s)" means "part(s) by weight."

(Production of Microchannel Device Shown in FIG. 7 to FIG. 10)

By the above-mentioned electroforming, a microchannel device shown in FIG. 7 to FIG. 10 is produced using a material of Al. Bonding of each thin-film pattern substrate is performed by room temperature bonding.

Each of the thin-film pattern substrates a1 to a7 has an external form of 30 mm×15 mm×0.5 mm.

In the thin-film pattern substrate a1, provided as the supply port 14 and the discharge port 18 are through-holes which are circular with sections of 2 mmφ and 1.5 mmφ, respectively, having the centers of sectional circles located at the centers in the short-side direction (7.5 mm from an end) of the thin-film pattern substrate a1 and 4.5 mm from an end in the long-side direction thereof.

In the thin-film pattern substrate a2, provided as the fluidic channels 50 and 52 are holes (through-holes) each having 10 mm×1 mm×0.5 mm, so that through-hole end portions are located at 2.5 mm from both ends in the short-side direction of the thin-film pattern substrate a2 and 4 mm from an end in the long-side direction thereof.

The fluidic channels 54a to 54e in the thin-film pattern substrate a3 are provided as through-holes each having a size of 22 mm×0.5 mm×0.5 mm. End portions in the long-side direction of the fluidic channels 54a to 54e are located at 4 mm from both end portions in the long-side direction of the thin-film pattern substrate a3, respectively. End portions in the short-side direction of the fluidic channels 54a and 54e are located at 2.5 mm from both end portions in the short-side direction of the thin-film pattern substrate a3, respectively. In addition, four intervals in the short-side direction of the fluidic channels 54a to 54e are provided as identical intervals to each other.

The filtration diaphragms 56a to 56e in the thin-film pattern substrate a4 are provided in identical shapes to those of the fluidic channels 54a to 54e in the thin-film pattern substrate a3, respectively. The filtration diaphragms 56a to 56e have a pore diameter of 15 μm. In addition, the shape of pores in the filtration diaphragms 56a to 56e is circular. The filters have an opening ratio of 47%.

The fluidic channels 58a to 58e in the thin-film pattern substrate a5 are provided in identical shapes to those of the fluidic channels 54a to 54e in the thin-film pattern substrate a3, respectively.

In the thin-film pattern substrate a6, provided as the fluidic channel 60 is a hole (through-hole) of 10 mm×1 mm×0.5 mm so that a through-hole end portion is located at 2.5 mm from one end in the short-side direction of the thin-film pattern substrate a6 and 4 mm from an end in the long-side direction thereof.

In the thin-film pattern substrate a7, provided as the discharge port 16 was a through-hole which is circular with a section of 1.5 mmφ, having the center of a sectional circle located at the center in the short-side direction (7.5 mm from an end) of the thin-film pattern a7 and 4.5 mm from one end in the long-side direction thereof.

(Production of Microchannel Device Shown in FIG. 12 to FIG. 15)

By the above-mentioned electroforming, a microchannel device shown in FIG. 12 to FIG. 15 is produced using a material of Ni. Bonding of each thin-film pattern substrate is performed by room temperature bonding.

Each of the thin-film pattern substrates b1 to b9 have an external form of 30 mm×15 mm×0.5 mm.

In the thin-film pattern substrate b1, provided as the supply port 104 and the discharge port 110 are through-holes which are circular with sections of 1.5 mmφ, respectively, having the centers of sectional circles located at the centers in the short-side direction (7.5 mm from an end) of the thin-film pattern substrate b1 and 4.5 mm from an end in the long-side direction thereof.

In the thin-film pattern substrate b2, provided as the fluidic channels 150 and 152 are through-holes whose through-hole end portions are located at 2.5 mm from both ends in the short-side direction of the thin-film pattern substrate b2 and 4 mm from an end in the long-side direction thereof, respectively, and each having a shape for which the center of a hole with a rectangular section of 10 mm×1 mm is swollen by a circle with a section of 1.5 mmφ.

In the thin-film pattern substrate b3, provided as the fluidic channels 154 and 156 are through-holes each having 10 mm×1 mm×0.5 mm, respectively, so that through-hole end portions are located at 2.5 mm from both ends in the short-side direction of the thin-film pattern substrate b3 and 4 mm from an end in the long-side direction thereof.

Moreover, in the thin-film pattern substrate b3, provided as the fluidic channels 158a to 158e between the fluidic channel 154 and the fluidic channel 156 are five through-holes connected with the fluidic channels 154 and 156 and each having 20 mm×0.5 mm×0.5 mm, with intervals between the fluidic channels of 1 mm parallel to the longitudinal direction of the thin-film pattern substrate b3.

The filtration diaphragms 160a to 160e in the thin-film pattern substrate b4 are provided in identical shapes to those of the fluidic channels 158a to 158e in the thin-film pattern substrate b3, respectively. The filtration diaphragms 160a to 160e have a pore diameter of 15 μm. In addition, the shape of pores in the filtration diaphragms 160a to 160e is triangular. The filters have an opening ratio of 55%.

The fluidic channels 162a to 162e in the thin-film pattern substrate b5 are provided in identical shapes to those of the fluidic channels 158a to 158e in the thin-film pattern substrate b3, respectively.

In the thin-film pattern substrate b5, provided as the fluidic channel 164 is a through-hole having a shape for which both end portions of a hole with a rectangular section of 10 mm×1 mm are swollen by circles with sections of 1.5 mmφ so that through-hole end portions are located at 2.5 mm from both ends in the short-side direction of the thin-film pattern substrate b5 and 4 mm from an end in the long-side direction thereof.

The filtration diaphragms 166a to 166e in the thin-film pattern substrate b6 are provided in identical shapes to those of the fluidic channels 158a to 158e in the thin-film pattern substrate b3, respectively, except that the size is 20 mm×0.5 mm×0.5 mm and their ends in the long side direction are located at 5 mm from one end in the long-side direction of the thin-film pattern substrate b6 and 10 mm from the other end. The filtration diaphragms 166a to 166e have a pore diameter of 10 μm. In addition, the shape of pores in the filtration diaphragms 166a to 166e is regular hexagonal. The filters have an opening ratio of 65%.

In the thin-film pattern substrate b6, provided as the fluidic channels 168 and 170 are through-holes which are circular with sections of 1.5 mmφ, having the centers of sectional circles located at 2.5 mm from each end in the short-side direction of the thin-film pattern substrate b6 and 4.5 mm from one end in the long-side direction thereof.

The fluidic channels 172a to 172e in the thin-film pattern substrate b7 are provided in identical shapes to those of the filtration diaphragms 166a to 166e in the thin-film pattern substrate b6.

For the fluidic channel 174 in the thin-film pattern substrate b7, a hole (through-hole) of 10 mm×1 mm×0.5 mm is provided so that a through-hole end portion is located at 2.5 mm from one end in the short-side direction of the thin-film pattern substrate b7 and 9 mm from an end in the long-side direction thereof.

In the thin-film pattern substrate b7, provided as the fluidic channel 176 is a through-hole whose through-hole end portions are located at 2.5 mm from both ends in the short-side direction of the thin-film pattern substrate b7 and 4 mm from one end in the long-side direction thereof and having a shape for which the center and both end portions of a hole with a rectangular section of 10 mm×1 mm are swollen by circles with sections of 1.5 mmφ.

In the thin-film pattern substrate b8, provided as the fluidic channel 178 is a through-hole whose through-hole end portions are located at 2.5 mm from both ends in the short-side direction of the thin-film pattern substrate b8 and 9 mm from one end in the long-side direction thereof and having a shape for which the center of a hole with a rectangular section of 10 mm×1 mm is swollen by a circle with a section of 1.5 mmφ.

In the thin-film pattern substrate b8, provided as the fluidic channel 180 is a through-hole which is circular with a section of 1.5 mmφ, having the center of a sectional circle located at the center in the short-side direction (7.5 mm from an end) of the thin-film pattern substrate b8 and 4.5 mm from one end in the long-side direction thereof.

In the thin-film pattern substrate b9, provided as the discharge port 106 is a through-hole which is circular with a section of 1.5 mmφ, having the center of a sectional circle located at the center in the short-side direction (7.5 mm from an end) of the thin-film pattern substrate b9 and 9.5 mm from one end in the long-side direction thereof.

In the thin-film pattern substrate b9, provided as the discharge port 108 is a through-hole which is circular with a section of 1.5 mmφ, having the center of a sectional circle located at the center in the short-side direction (7.5 mm from an end) of the thin-film pattern substrate b9 and 4.5 mm from one end in the long-side direction thereof.

(Production of Microchannel Device shown in FIG. 16)

Thin-film pattern substrates c1, c2, c4, and c5 of a microchannel device shown in FIG. 16 are produced using a material of Cu.

Figure 18A:
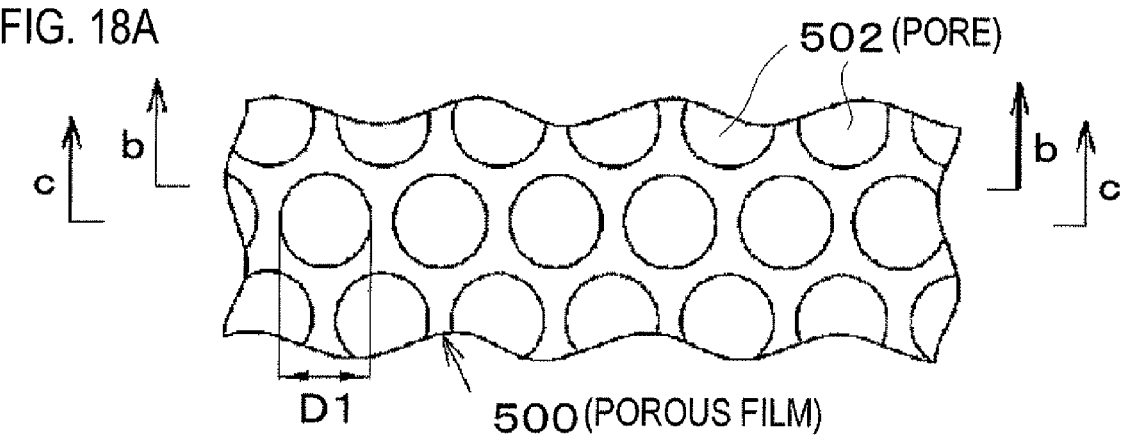
FIGS. 18A to 18C are schematic views of a resin porous film 500 having a filter pore diameter of 10 μm used in Example 3, where
Figure 18B:
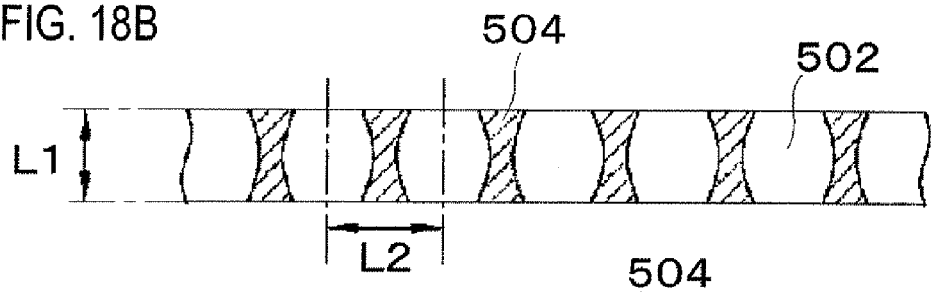
Figure 18C:
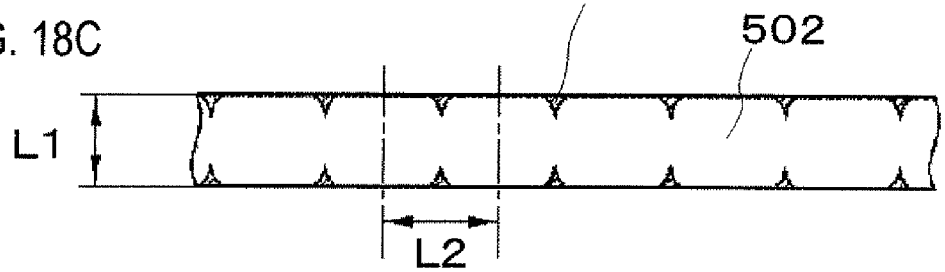

A porous film (honeycomb film) produced according to the method described in Example 1 of Japanese Published Unexamined Patent Application No. 2007-291367 shown in FIGS. 18A to 18C which is a resin porous film made from polyalkylacrylamide and poly(ε-caprolactone) having a filter pore diameter D1 of 10 μm, a coefficient of variation in pore diameter of 3.5%, a pore interval L2 of 13 μm, an opening ratio of 53%, and a film thickness L1 of 9.5 μm as measured by a scanning electron microscope is used as a thin-film pattern substrate c3. Here, as for bonding of the respective thin-film pattern substrates, the respective thin-film pattern substrates c1 to c5 are fixed by use of a tightening jig (not shown) in a manner of fixing these by tightening with screws (not shown), and then used while a leak from the porous film is prevented.

Example 1

A styrene-n-butylacrylate resin particle dispersion liquid (composition ratio of 75:25, weight average molecular weight of 35,000) is classified. The resin has a specific gravity of 1.08, and by mixing particles having average particle diameters of 5 μm, 10 μm, and 20 μm in a volume ratio of 8:1:1, respectively, and dispersion processing with ion exchange water, a resin particle dispersion liquid with a concentration of 10 percent by volume is prepared. Particle size distribution data of the resin particle dispersion liquid measured by a Coulter counter TA-II (manufactured by Beckman Coulter, Inc.) shows a particle size distribution having a large peak of 5 μm and two small peaks of 10 μm and 20 μm.

A separation-concentration process of the resin particle dispersion liquid is performed using the separation apparatus shown in FIG. 6. For the microchannel device, the microchannel device shown in FIG. 7 to FIG. 10 produced in the foregoing is used. For the pump, a Mohno pump (Type CY04F: Manufactured by HEISHIN Ltd.) is used, and piping valves are adjusted, and the liquid is fed so that pressures of P1 and P2 become 100 kPa and 50 kPa, respectively. As a result of measurement by the Coulter counter TA-II of the particle size distribution of a resin particle dispersion liquid collected in the container 22 of FIG. 6, the resin particle dispersion liquid shows a particle size distribution having no particle peak of 20 μm and two small and large particle peaks of 10 μm and 5 μm.

Example 2

A separation-concentration process of the resin particle dispersion liquid is performed using the separation apparatus shown in FIG. 11. For the microchannel device, the microchannel device shown in FIG. 12 to FIG. 15 produced in the foregoing is used. As in Example 1, the Mohno pump is used, piping valves are adjusted, and the liquid is fed so that pressure P1 in the fluidic channel L5, pressure P2 in the fluidic channel L7, and pressure P3 in the fluidic channel L6 become 200 kPa, 100 kPa, and 70 kPa, respectively. As a result of measurement by the Coulter counter TA-II of the particle size distribution of resin particle dispersion liquids collected in the container 116 and the container 114 of FIG. 11, the resin particle dispersion liquid collected in the container 116 shows a particle size distribution having no particle peak of 20 μm, small particle peak of 10 μm and large particle peak of 5 μm, and the resin particle dispersion liquid collected in the container 114 shows a distribution having only a particle peak of 5 μm without particle peaks of 10 μm and 20 μm.

Example 3

The separation apparatus shown in FIG. 6 is used, and for the microchannel device, the microchannel device shown in FIG. 16 produced in the foregoing is used. As in Example 1, the Mohno pump is used, piping valves are adjusted, and the liquid is fed so that pressure P1 in the fluidic channel L1 and pressure P2 in the fluidic channel L2 become 10 kPa and 5 kPa, respectively. As a result of measurement by the Coulter counter TA-II of the particle size distribution of a resin particle dispersion liquid collected in the container 22 of FIG. 6r the resin particle dispersion liquid shows a particle size distribution having no particle peak of 20 μm and a very small peak of 10 μm and a large peak of 5 μm.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. A microchannel device comprising:
a microfluidic channel including a sub fluidic channel in which at least a first filtration diaphragm and a second filtration diaphragm are provided,
wherein the microfluidic channel has at least a supply port, a first discharge port, a second discharge port, and a third discharge port,
the supply port and the sub fluidic channel are connected through the first filtration diaphragm,
the supply port and the first discharge port are connected through the first filtration diaphragm,
the supply port and the second discharge port are directly connected,
the sub fluidic channel and the first discharge port are directly connected,
the sub fluidic channel and the third discharge port are connected through the second diaphragm,
the first and second filtration diaphragms are provided parallel to a fluidic channel direction of the microfluidic channel,
a space is disposed among the first and second filtration diaphragms, the space being a part of the sub fluidic channel, and
each filtration diaphragm has a filter pore diameter, the filter pore diameters of the first and second filtration diaphragms being reduced in order from the supply port to the first discharge port.

2. The microchannel device according to claim 1,
wherein the first and second filtration diaphragms are filters having a mesh structure, a metallic filter, a honeycomb filter made of plastic or a ceramic filter.

3. The microchannel device according to claim 1,
wherein the first and second filtration diaphragms are formed with filter pores having a circular shape, an elliptical shape, a triangular shape, a quadrangular shape or a hexagonal shape.

4. The microchannel device according to claim 1,
wherein a length of the sub fluidic channel is from 5 mm to 300 mm.

5. The microchannel device according to claim 1,
wherein a length of the sub fluidic channel is from 10 mm to 200 mm.

6. The microchannel device according to claim 1 which is obtained by laminating thin-film patterns in sequence.

7. A separation apparatus comprising:
the microchannel device according to claim 1.

8. A separation method comprising:
separating a particle dispersion liquid using the microchannel device according to claim 1.

9. The separation method according to claim 8,
wherein the first and second filtration diaphragms of the microchannel device are formed with filter pores having a shape other than circle, and
the particle dispersion liquid contains particles that are approximately spherical.

10. The separation method according to claim 8,
wherein the microchannel device has n filtration diaphragms, and satisfy the expression:

$$P_0 \geq P_1 \geq P_2 \geq \ldots \geq P_n$$

where $P_n$ represents a pressure after passing through the n filtration diaphragms and n represents an integral number.

11. The separation method according to claim 8 further comprising:
cleaning an inside of the microchannel device by applying a dispersion medium or gas through the first discharge port of the microchannel device, caulking the second discharge port, and discharging the dispersion medium or gas through the supply port of the microchannel device.

12. The microchannel device according to claim 1, wherein a diameter of the microfluidic channel is from 10 μm to 5,000 μm.

13. The microchannel device according to claim 1, wherein a diameter of the microfluidic channel is from 20 μm to 3,000 μm.

* * * * *